US008655821B2

(12) United States Patent
Aliferis et al.

(10) Patent No.: US 8,655,821 B2
(45) Date of Patent: Feb. 18, 2014

(54) LOCAL CAUSAL AND MARKOV BLANKET INDUCTION METHOD FOR CAUSAL DISCOVERY AND FEATURE SELECTION FROM DATA

(76) Inventors: Konstantinos (Constantin) F. Aliferis, New York, NY (US); Alexander Statnikov, New York, NY (US)

(*) Notice: Subject to any disclaimer, the term of this patent is extended or adjusted under 35 U.S.C. 154(b) by 0 days.

(21) Appl. No.: 12/700,689

(22) Filed: Feb. 4, 2010

(65) Prior Publication Data

US 2011/0307437 A1    Dec. 15, 2011

Related U.S. Application Data

(60) Provisional application No. 61/149,758, filed on Feb. 4, 2009.

(51) Int. Cl.
*G06F 9/44* (2006.01)
*G06N 5/02* (2006.01)

(52) U.S. Cl.
USPC .......................................................... 706/46

(58) Field of Classification Search
USPC .................................................... 706/12, 46
See application file for complete search history.

(56) References Cited

U.S. PATENT DOCUMENTS 7,117,185 B1 * 10/2006 Aliferis et al. ................. 706/46
2009/0271338 A1 * 10/2009 Chidlovskii et al. ........... 706/12
2009/0307160 A1 * 12/2009 Minh et al. ..................... 706/12

OTHER PUBLICATIONS

Aliferis, C.F. et al. "HITON: A Novel Markov Blanket Algorithm for Optimal Variable Selection". AMIA 2003 Symposium Proceedings. pp. 21-25.*
Tsamardinos, I. et al. "Time and Same Efficient Discovery of Markov Blankets and Direct Causal Relations". SIGKDD'03, ACM, Aug. 24-27, 2003. pp. 673-678.*
Tsamardinos, I. et al. "The max-min hill-climbing Bayesian network structure learning algorithm". Machine Learning vol. 65 Issue 1, Oct. 2006. pp. 31-78. DOI 10.1007/s10994-006-6889-7.*

* cited by examiner

*Primary Examiner* — Jeffrey A Gaffin
*Assistant Examiner* — Benjamin Buss
(74) *Attorney, Agent, or Firm* — Laurence Weinberger

(57) ABSTRACT

Methods for discovery of local causes/effects and of Markov blankets enable discovery of causal relationships from large data sets and provide principled solutions to the variable/feature selection problem, an integral part of predictive modeling. The present invention provides a generative method for learning local causal structure around target variables of interest in the form of direct causes/effects and Markov blankets applicable to very large real world datasets even with small samples. The selected feature sets can be used for causal discovery, classification, and regression. The generative method GLL can be instantiated in many ways giving rise to novel method variants. The method transforms a dataset with many variables into either a minimal reduced dataset where all variables are needed for optimal prediction of the response variable, or a dataset where all variables are direct causes and direct effects or the Markov blanket of the response variable.

21 Claims, 23 Drawing Sheets

Figure 1:
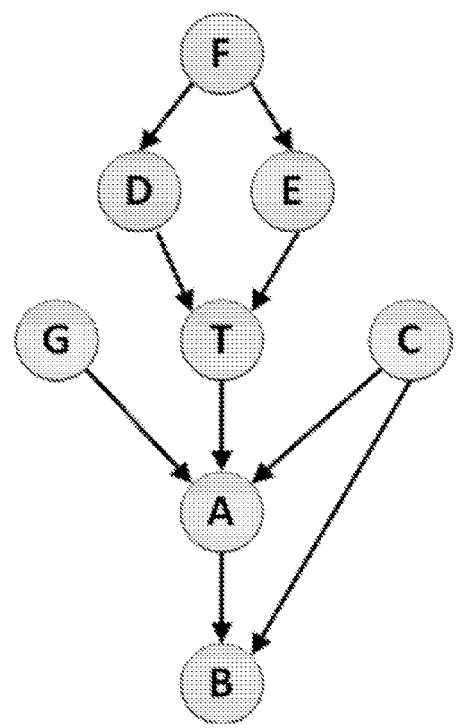

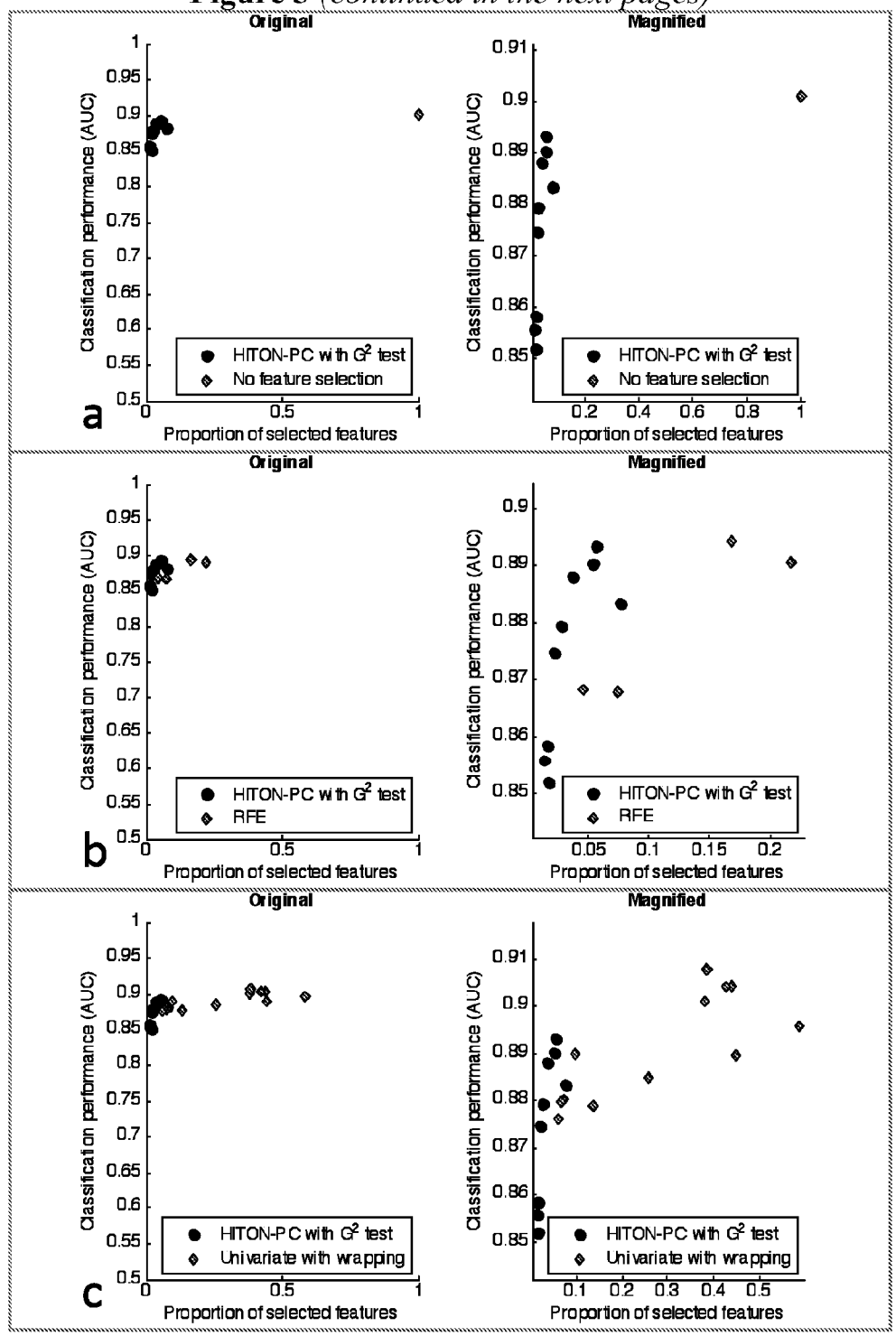
Figure 3 *(continued in the next pages)*

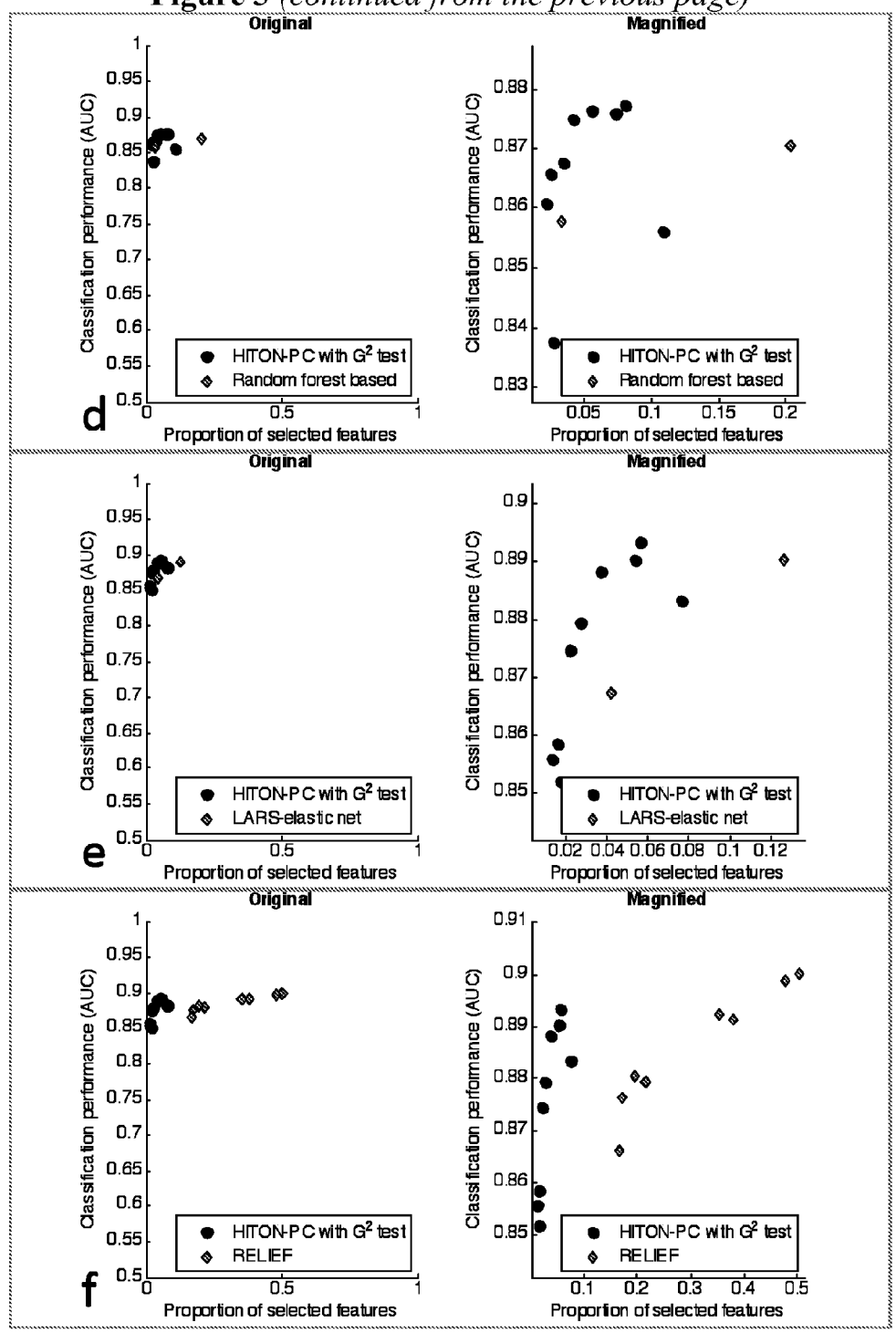
Figure 3 *(continued from the previous page)*

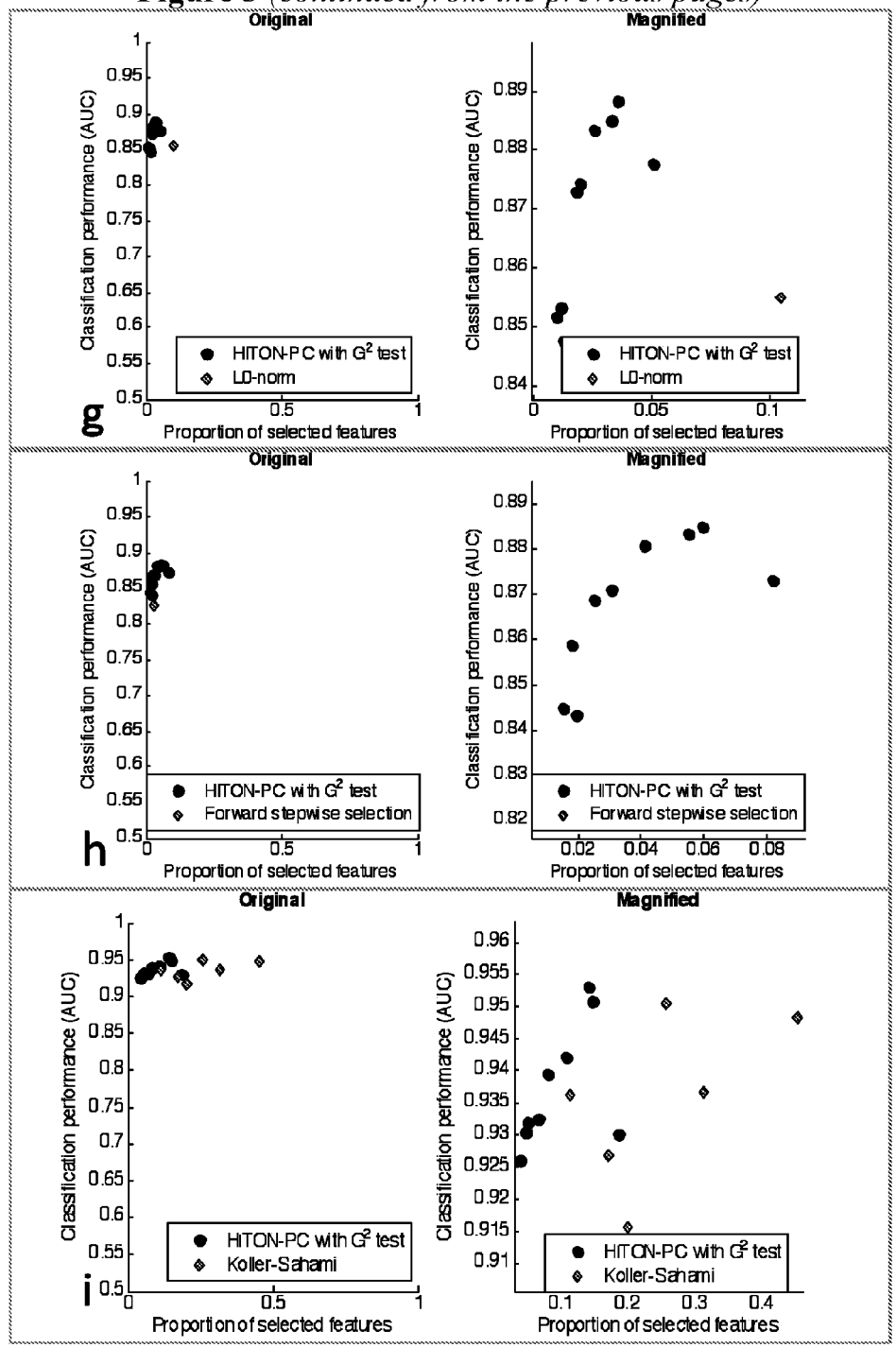
Figure 3 *(continued from the previous pages)*

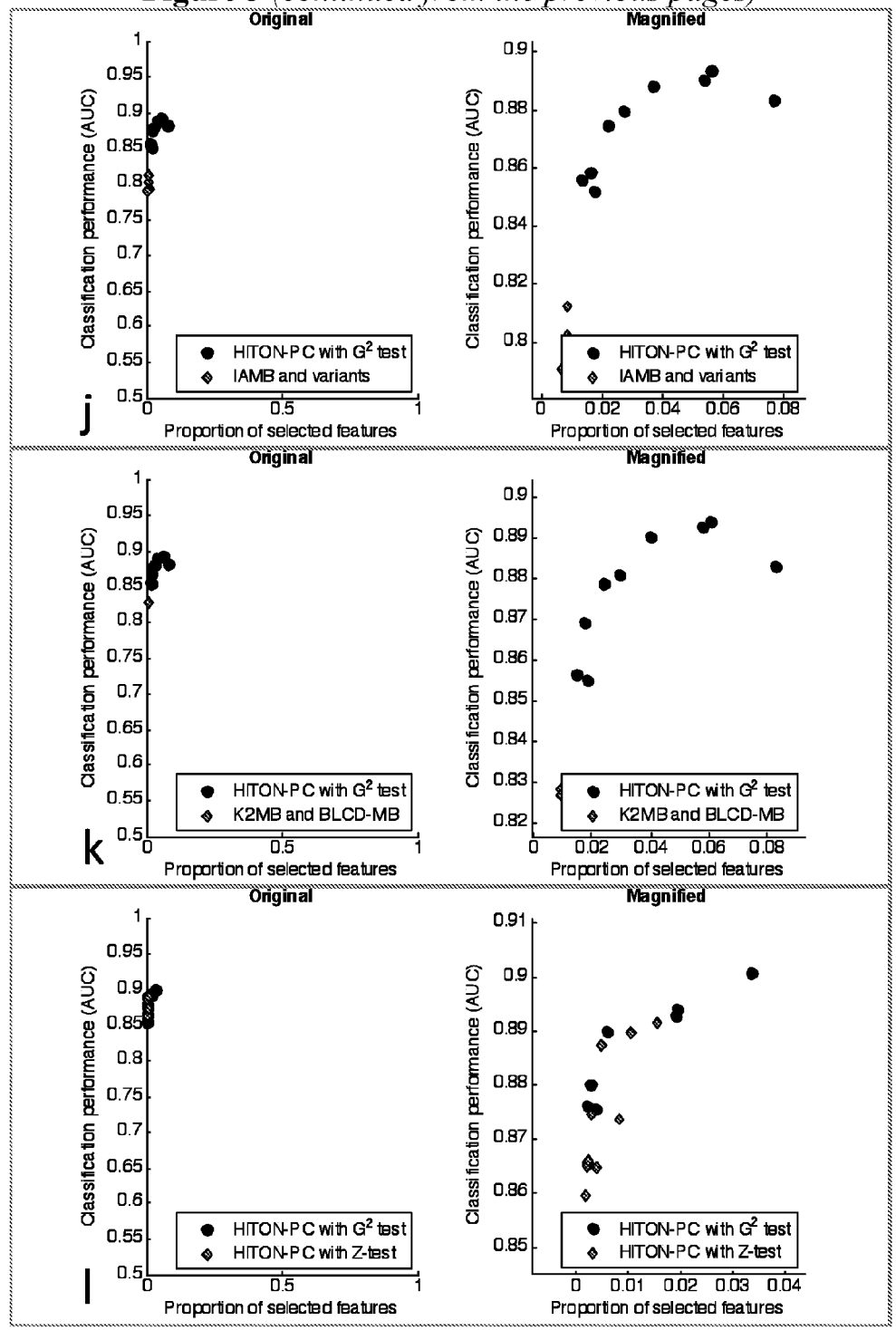
Figure 3 *(continued from the previous pages)*

Figure 3 *(continued from the previous pages)*
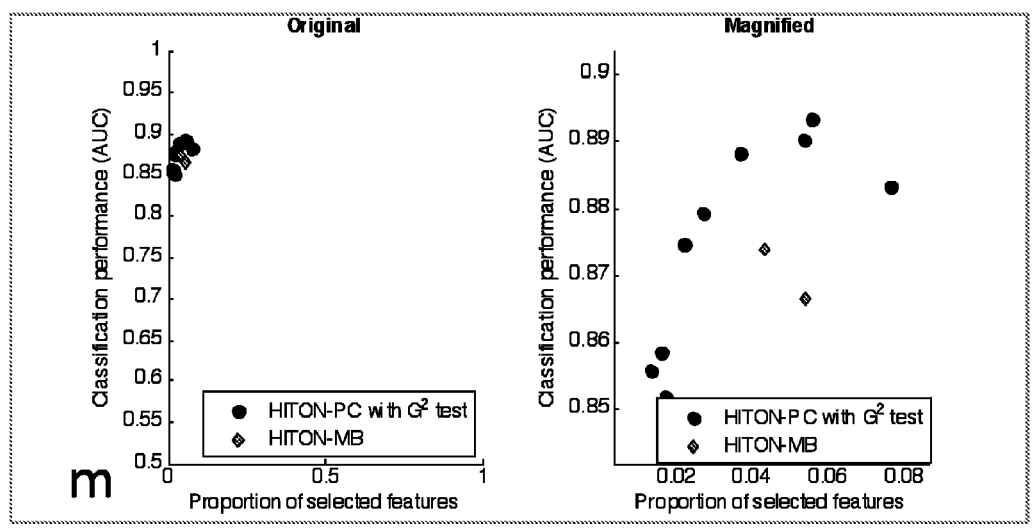

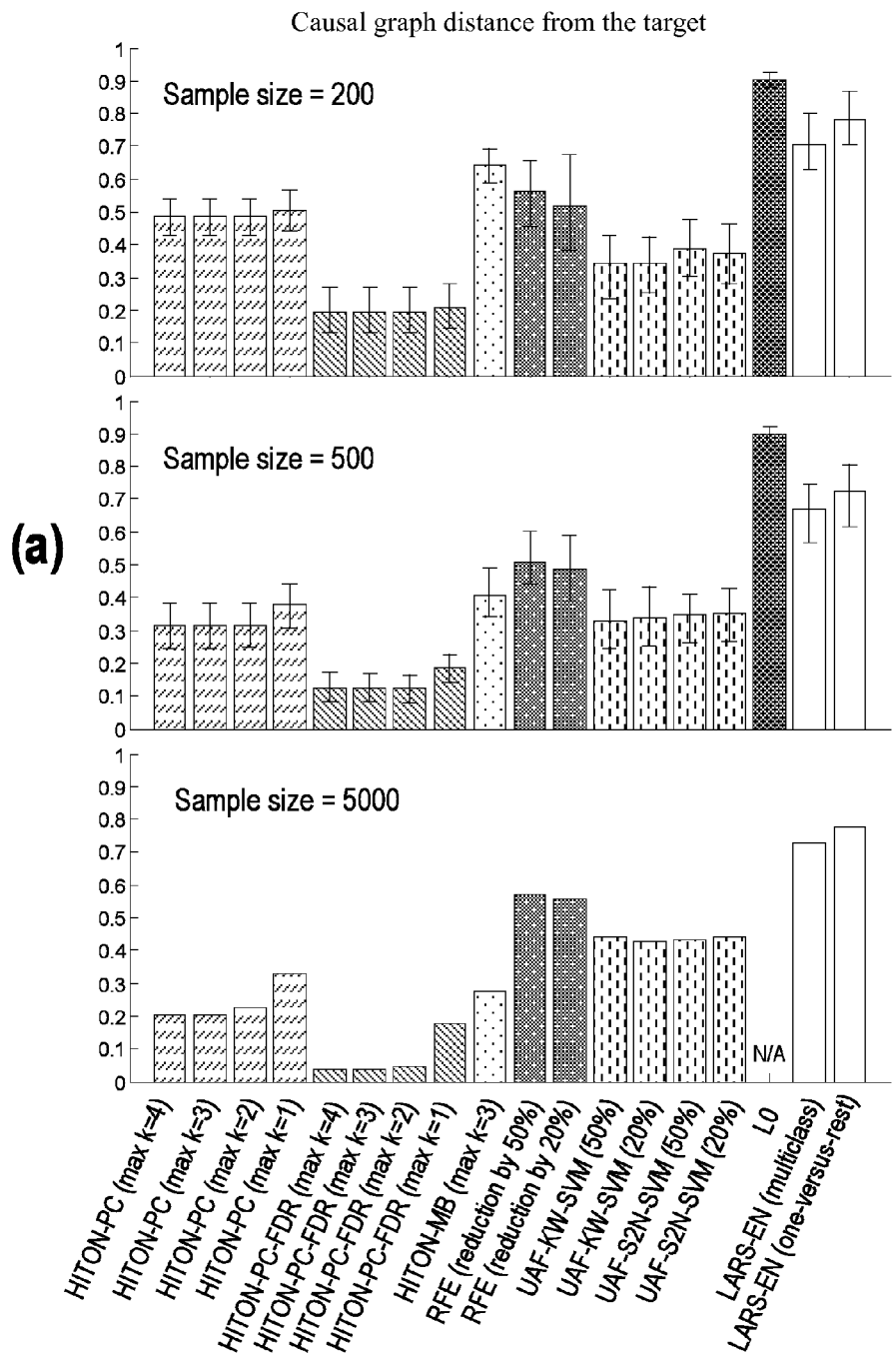
Figure 4 *(continued in the next page)*

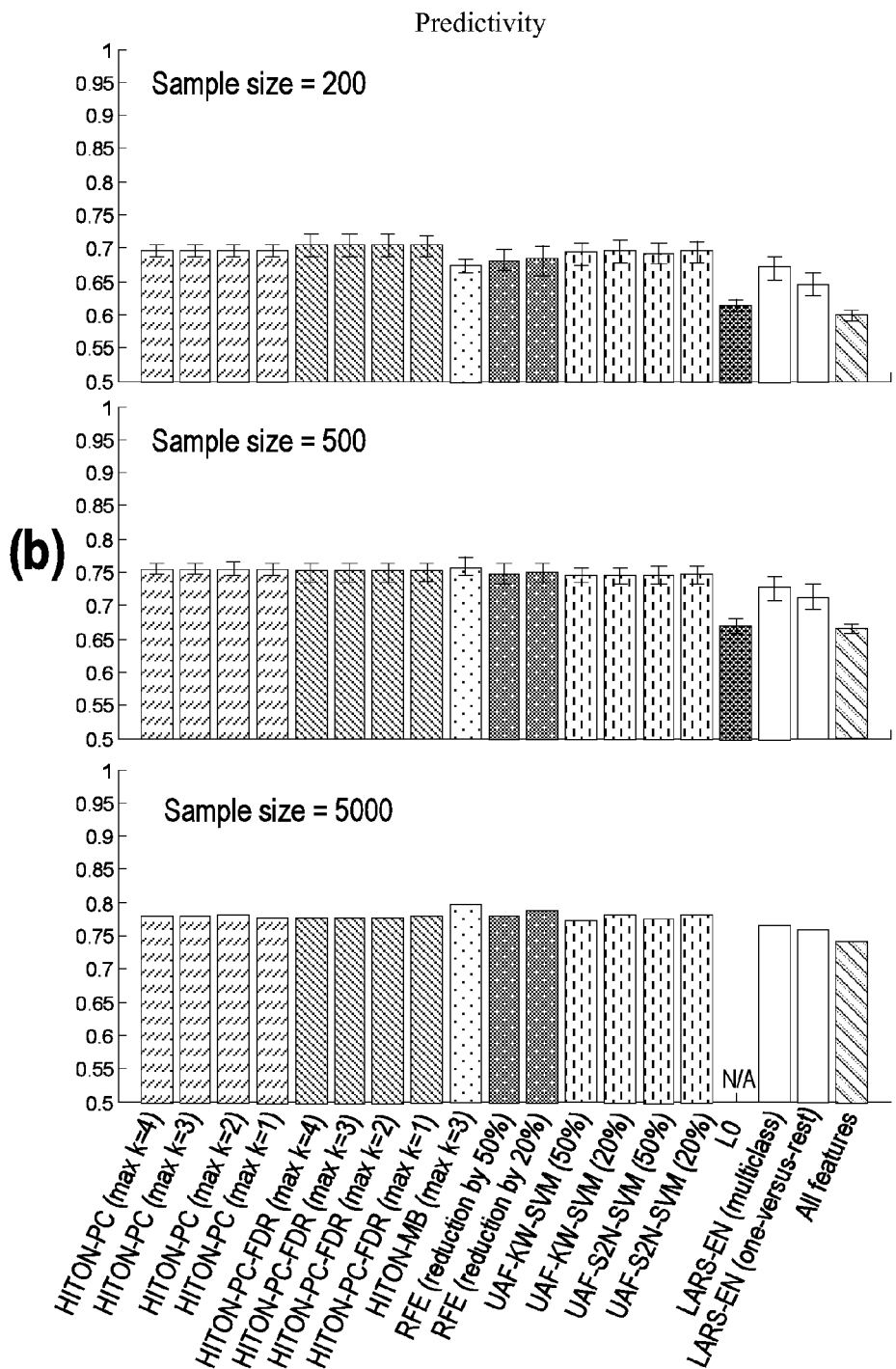
Figure 4 *(continued from the previous page)*

Figure 5

Sample size = 200

|  | Child10 | Insurance10 | Alarm10 | Hailfinder10 | Pigs | Link | Lung_Cancer | Gene | Average |
|---|---|---|---|---|---|---|---|---|---|
| HITON-PC (max k=4) | 0.43 | 0.41 | 0.42 | 0.83 | 0.41 | 0.44 | 0.44 | 0.50 | 0.48 |
| HITON-PC (max k=3) | 0.43 | 0.41 | 0.42 | 0.83 | 0.41 | 0.44 | 0.44 | 0.50 | 0.48 |
| HITON-PC (max k=2) | 0.43 | 0.41 | 0.42 | 0.83 | 0.41 | 0.44 | 0.44 | 0.50 | 0.48 |
| HITON-PC (max k=1) | 0.45 | 0.42 | 0.42 | 0.83 | 0.41 | 0.46 | 0.53 | 0.50 | 0.50 |
| HITON-PC-FDR (max k=4) | 0.29 | 0.15 | 0.24 | 0.18 | 0.10 | 0.17 | 0.24 | 0.18 | 0.19 |
| HITON-PC-FDR (max k=3) | 0.29 | 0.15 | 0.24 | 0.18 | 0.10 | 0.17 | 0.24 | 0.18 | 0.19 |
| HITON-PC-FDR (max k=2) | 0.29 | 0.15 | 0.24 | 0.18 | 0.10 | 0.17 | 0.24 | 0.18 | 0.19 |
| HITON-PC-FDR (max k=1) | 0.29 | 0.15 | 0.24 | 0.18 | 0.10 | 0.17 | 0.34 | 0.18 | 0.21 |
| HITON-MB (max k=3) | 0.70 | 0.68 | 0.50 | 0.99 | 0.49 | 0.66 | 0.50 | 0.64 | 0.64 |
| RFE (reduction of features by 50%) | 0.58 | 0.38 | 0.50 | 0.71 | 0.52 | 0.45 | 0.75 | 0.59 | 0.56 |
| RFE (reduction of features by 20%) | 0.57 | 0.46 | 0.54 | 0.65 | 0.46 | 0.30 | 0.63 | 0.54 | 0.52 |
| UAF-KruskalWallis-SVM (50%) | 0.45 | 0.27 | 0.32 | 0.50 | 0.26 | 0.34 | 0.34 | 0.26 | 0.34 |
| UAF-KruskalWallis-SVM (20%) | 0.43 | 0.32 | 0.38 | 0.55 | 0.27 | 0.29 | 0.29 | 0.22 | 0.34 |
| UAF-Signal2Noise-SVM (50%) | 0.47 | 0.31 | 0.44 | 0.47 | 0.33 | 0.35 | 0.46 | 0.27 | 0.39 |
| UAF-Signal2Noise-SVM (20%) | 0.44 | 0.35 | 0.40 | 0.56 | 0.28 | 0.29 | 0.44 | 0.25 | 0.38 |
| L0 | 0.95 | 0.93 | 0.83 | 0.97 | 0.99 | 0.83 | 0.82 | 0.92 | 0.90 |
| LARS-EN (for multiclass response) | 0.67 | 0.70 | 0.64 | 0.79 | 0.78 | 0.66 | 0.64 | 0.78 | 0.71 |
| LARS-EN (one-versus-rest) | 0.83 | 0.68 | 0.67 | 0.92 | 0.89 | 0.70 | 0.67 | 0.89 | 0.78 |

Sample size = 500

|  | Child10 | Insurance10 | Alarm10 | Hailfinder10 | Pigs | Link | Munin | Lung_Cancer | Gene | Average |
|---|---|---|---|---|---|---|---|---|---|---|
| HITON-PC (max k=4) | 0.23 | 0.26 | 0.32 | 0.57 | 0.27 | 0.33 | 0.24 | 0.28 | 0.32 | 0.31 |
| HITON-PC (max k=3) | 0.23 | 0.26 | 0.32 | 0.57 | 0.27 | 0.33 | 0.24 | 0.28 | 0.32 | 0.31 |
| HITON-PC (max k=2) | 0.23 | 0.26 | 0.32 | 0.57 | 0.27 | 0.33 | 0.24 | 0.29 | 0.32 | 0.32 |
| HITON-PC (max k=1) | 0.24 | 0.28 | 0.37 | 0.57 | 0.34 | 0.39 | 0.24 | 0.52 | 0.45 | 0.38 |
| HITON-PC-FDR (max k=4) | 0.09 | 0.08 | 0.20 | 0.13 | 0.02 | 0.11 | 0.29 | 0.14 | 0.07 | 0.12 |
| HITON-PC-FDR (max k=3) | 0.09 | 0.08 | 0.20 | 0.13 | 0.02 | 0.11 | 0.29 | 0.13 | 0.07 | 0.12 |
| HITON-PC-FDR (max k=2) | 0.09 | 0.08 | 0.20 | 0.13 | 0.02 | 0.11 | 0.29 | 0.11 | 0.07 | 0.12 |
| HITON-PC-FDR (max k=1) | 0.09 | 0.11 | 0.23 | 0.13 | 0.08 | 0.12 | 0.29 | 0.40 | 0.22 | 0.19 |
| HITON-MB (max k=3) | 0.28 | 0.34 | 0.37 | 0.85 | 0.30 | 0.43 | 0.35 | 0.34 | 0.38 | 0.41 |
| RFE (reduction of features by 50%) | 0.63 | 0.51 | 0.61 | 0.53 | 0.37 | 0.40 | 0.26 | 0.70 | 0.56 | 0.51 |
| RFE (reduction of features by 20%) | 0.54 | 0.48 | 0.69 | 0.53 | 0.41 | 0.39 | 0.26 | 0.58 | 0.49 | 0.49 |
| UAF-KruskalWallis-SVM (50%) | 0.37 | 0.27 | 0.42 | 0.49 | 0.21 | 0.39 | 0.34 | 0.27 | 0.24 | 0.33 |
| UAF-KruskalWallis-SVM (20%) | 0.40 | 0.27 | 0.41 | 0.48 | 0.26 | 0.40 | 0.30 | 0.26 | 0.25 | 0.34 |
| UAF-Signal2Noise-SVM (50%) | 0.40 | 0.27 | 0.42 | 0.51 | 0.22 | 0.45 | 0.29 | 0.33 | 0.22 | 0.35 |
| UAF-Signal2Noise-SVM (20%) | 0.42 | 0.30 | 0.43 | 0.51 | 0.23 | 0.43 | 0.30 | 0.32 | 0.24 | 0.35 |
| L0 | 0.98 | 0.97 | 0.93 | 0.98 | 0.99 | 0.87 | 0.53 | 0.87 | 0.97 | 0.90 |
| LARS-EN (for multiclass response) | 0.67 | 0.71 | 0.70 | 0.75 | 0.78 | 0.68 | 0.33 | 0.60 | 0.79 | 0.67 |
| LARS-EN (one-versus-rest) | 0.70 | 0.74 | 0.74 | 0.91 | 0.90 | 0.77 | 0.30 | 0.62 | 0.82 | 0.72 |

Sample size = 5000

|  | Child10 | Insurance10 | Alarm10 | Hailfinder10 | Pigs | Link | Munin | Lung_Cancer | Gene | Average |
|---|---|---|---|---|---|---|---|---|---|---|
| HITON-PC (max k=4) | 0.13 | 0.16 | 0.25 | 0.35 | 0.20 | 0.19 | 0.04 | 0.23 | 0.30 | 0.20 |
| HITON-PC (max k=3) | 0.13 | 0.16 | 0.25 | 0.35 | 0.20 | 0.19 | 0.04 | 0.23 | 0.30 | 0.20 |
| HITON-PC (max k=2) | 0.13 | 0.17 | 0.25 | 0.33 | 0.22 | 0.19 | 0.04 | 0.36 | 0.33 | 0.23 |
| HITON-PC (max k=1) | 0.18 | 0.27 | 0.29 | 0.33 | 0.30 | 0.42 | 0.04 | 0.63 | 0.50 | 0.33 |
| HITON-PC-FDR (max k=4) | 0.00 | 0.03 | 0.10 | 0.10 | 0.00 | 0.08 | 0.04 | 0.00 | 0.00 | 0.04 |
| HITON-PC-FDR (max k=3) | 0.00 | 0.03 | 0.10 | 0.10 | 0.00 | 0.08 | 0.04 | 0.00 | 0.00 | 0.04 |
| HITON-PC-FDR (max k=2) | 0.00 | 0.05 | 0.10 | 0.10 | 0.00 | 0.08 | 0.04 | 0.08 | 0.00 | 0.05 |
| HITON-PC-FDR (max k=1) | 0.01 | 0.17 | 0.14 | 0.11 | 0.16 | 0.16 | 0.04 | 0.55 | 0.23 | 0.18 |
| HITON-MB (max k=3) | 0.17 | 0.20 | 0.28 | 0.38 | 0.27 | 0.30 | 0.20 | 0.33 | 0.35 | 0.28 |
| RFE (reduction of features by 50%) | 0.63 | 0.64 | 0.58 | 0.59 | 0.40 | 0.90 | 0.28 | 0.66 | 0.48 | 0.57 |
| RFE (reduction of features by 20%) | 0.58 | 0.58 | 0.69 | 0.54 | 0.54 | 0.92 | 0.22 | 0.50 | 0.43 | 0.56 |
| UAF-KruskalWallis-SVM (50%) | 0.37 | 0.37 | 0.62 | 0.55 | 0.42 | 0.69 | 0.38 | 0.39 | 0.20 | 0.44 |
| UAF-KruskalWallis-SVM (20%) | 0.37 | 0.40 | 0.60 | 0.54 | 0.27 | 0.59 | 0.41 | 0.42 | 0.24 | 0.43 |
| UAF-Signal2Noise-SVM (50%) | 0.46 | 0.35 | 0.65 | 0.54 | 0.43 | 0.67 | 0.24 | 0.31 | 0.25 | 0.43 |
| UAF-Signal2Noise-SVM (20%) | 0.39 | 0.42 | 0.58 | 0.51 | 0.31 | 0.60 | 0.39 | 0.50 | 0.25 | 0.44 |
| LARS-EN (for multiclass response) | 0.67 | 0.85 | 0.65 | 0.87 | 0.74 | 0.75 | 0.52 | 0.71 | 0.79 | 0.73 |
| LARS-EN (one-versus-rest) | 0.71 | 0.86 | 0.74 | 0.84 | 0.95 | 0.80 | 0.48 | 0.74 | 0.88 | 0.78 |

Figure 7

Table 1

**GLL-PC: High-level pseudocode and main components of Generalized Local Learning - Parents and Children. Returns *PC(T)***

1. $U \leftarrow$ GLL-PC-nonsym($T$)   // first approximate *PC(T)* without symmetry check
2. For all $X \in U$
3.    If $T \notin$ GLL-PC-nonsym($X$) then $U \leftarrow U \setminus \{X\}$   // check for symmetry
4. Return $U$   // true set of parents and children

GLL-PC-nonsym($T$) // returns a set which is a subset of *EPC(T)* and a superset of *PC(T)*

1. Initialization
   a. Initialize a set of candidates for the true *PC(T)* set: $TPC(T) \leftarrow S$, s.t. $S \subseteq V \setminus \{T\}$
   b. Initialize a priority queue of variables to be examined for inclusion in *TPC(T)*: OPEN $\leftarrow V \setminus \{T \cup TPC(T)\}$
2. Apply <u>inclusion heuristic function</u>
   a. Prioritize variables in OPEN for inclusion in *TPC(T)*;
   b. Throw away non-eligible variables from OPEN;
   c. Insert in *TPC(T)* the highest-priority variable(s) in OPEN and remove them from OPEN
3. Apply <u>elimination strategy</u> to remove variables from *TPC(T)*
4. Apply <u>interleaving strategy</u> by repeating steps No. 2 and No. 3 until a termination criterion is met
5. Return *TPC(T)*

Figure 8

Table 2

GLL-PC: Admissibility rules

1. The inclusion heuristic function should respect the following requirement:

// Admissibility rule No. 1
    All variables $X \in PC(T)$ are eligible for inclusion in the candidate set $TPC(T)$ and each one is assigned a non-zero value by the ranking function. Variables with zero values are discarded and never considered again.

Note that variables may be re-ranked after each update of the candidate set, or the original ranking may be used throughout the method's operation.

2. The elimination strategy should satisfy the following requirement:

// Admissibility rule No. 2
    All and only variables that become independent of the target variable $T$ given any subset of the candidate set $TPC(T)$ are discarded and never considered again (whether they are inside or outside $TPC(T)$).

3. The interleaving strategy iterates inclusion and elimination any number of times provided that iterating stops when the following criterion is satisfied:

//Admissibility rule No. 3
    At termination no variable outside the set $TPC(T)$ is eligible for inclusion and no variable in the candidate set can be removed at termination.

Figure 9

Table 3

Semi-Interleaved HITON-PC with symmetry correction
Derived from GLL-PC with following instantiation specifics:

<u>Initialization</u>
$TPC(T) \leftarrow \emptyset$

<u>Inclusion heuristic function</u>
  i. Sort in descending order the variables $X$ in OPEN according to their pairwise association with $T$, i.e., $Assoc(X, T|\emptyset)$.
  ii. Remove from OPEN variables with zero association with $T$, i.e., when $I(X, T|\emptyset)$
  iii. Insert at end of $TPC(T)$ the first variable in OPEN and remove it from OPEN <u>Elimination strategy</u>
  If OPEN=$\emptyset$
      For each $X \in TPC(T)$
          If $\exists Z \subseteq TPC(T)\backslash\{X\}$, s.t. $I(X, T|Z)$ remove $X$ from $TPC(T)$
  Else
      $X \leftarrow$ last variable added to $TPC(T)$ // in step 2 of GLL-PC-nonsym
      If $\exists Z \subseteq TPC(T)\backslash\{X\}$, s.t. $I(X, T|Z)$ remove $X$ from $TPC(T)$ <u>Interleaving strategy</u>
Repeat
    steps No. 2 and No. 3 of GLL-PC-nonsym
Until OPEN=$\emptyset$

Figure 10

Table 4

| Step of GLL-PC-nonsym | Comments | OPEN | TPC(T) |
|---|---|---|---|
| 1 | Initialize TPC(T) and OPEN | {A, B, C, D, E, F, G} | ∅ |
| 2a (I) | Prioritize variables in OPEN for inclusion in TPC(T) | {F, D, E, A, B, G, C} | ∅ |
| 2b (I) | Throw away non-eligible members of OPEN (G and C) | {F, D, E, A, B} | ∅ |
| 2c (I) | Insert in TPC(T) the highest-priority variable in OPEN (F) and remove it from OPEN | {D, E, A, B} | {F} |
| 3 (I) | Apply elimination strategy to TPC(T): no effect | {D, E, A, B} | {F} |
| 2 (II) | Insert the highest-priority variable (D) in TPC(T) and remove it from OPEN | {E, A, B} | {F, D} |
| 3 (II) | Apply elimination strategy to TPC(T): no effect | {E, A, B} | {F, D} |
| 2 (III) | Insert the highest-priority variable (E) in TPC(T) and remove it from OPEN | {A, B} | {F, D, E} |
| 3 (III) | Apply elimination strategy to TPC(T): No effect | {A, B} | {F, D, E} |
| 2 (IV) | Insert the highest-priority variable (A) in TPC(T) and remove it from OPEN | {B} | {F, D, E, A} |
| 3 (IV) | Apply elimination strategy to TPC(T): no effect | {B} | {F, D, E, A} |
| 2 (V) | Insert the highest-priority variable (B) in TPC(T) and remove it from OPEN | ∅ | {F, D, E, A, B} |
| 3 (V) | Apply elimination strategy to TPC(T): remove F since I(T, F\|{D,E}) | ∅ | {D, E, A, B} |
| 4 | Stop interleaving since OPEN = ∅ | ∅ | {D, E, A, B} |

Figure 11

Table 5

GLL-MB: Generalized Local Learning - Markov Blanket

1. $PC(T) \leftarrow$ GLL-PC(T)    // obtain PC(T) by running *GLL-PC* for variable *T*
2. For every variable $Y \in PC(T)$
    $PC(Y) \leftarrow$ GLL-PC(Y)    // obtain PC(Y) for every member *Y* of PC(T)
3. $TMB(T) \leftarrow PC(T)$    // initialize *TMB(T)* with *PC(T)* members
4. $S \leftarrow \{\cup_{Y \in PC(T)} PC(Y)\} \setminus \{PC(T) \cup \{T\}\}$    // these are the potential spouses
5. For every variable $X \in S$
    a. Retrieve a subset $Z$ s.t. $I(X, T \mid Z)$ // subset was identified and stored in steps 1 and 2
    b. For every variable $Y \in PC(T)$ s.t. $X \in PC(Y)$ // *Y* is a potential common child of *T* and *X*
    c.    If $\neg I(X, T \mid Z \cup \{Y\})$    // *X* is a spouse
    d.        Insert *X* into *TMB(T)*
6. Optionally: Eliminate from *TMB(T)* predictively redundant members using a backward wrapper approach.
7. Return *TMB(T)*

Figure 12

Table 6

| Feature-selection method | Predicitivity | | Reduction | |
|---|---|---|---|---|
| | P-value | Nominal winner | P-value | Nominal winner |
| No feature selection | 0.1890 | Other | <0.0001 | HITON-PC |
| RFE: 4 variants | 0.9754 | Other | 0.0046 | HITON-PC |
| | 0.8030 | Other | 0.0042 | HITON-PC |
| | 0.1312 | HITON-PC | 0.3634 | HITON-PC |
| | 0.1008 | HITON-PC | 0.6816 | Other |
| UAF-KruskalWallis-SVM: 4 variants | 0.2248 | Other | 0.0028 | HITON-PC |
| | 0.0098 | Other | 0.0004 | HITON-PC |
| | 1.0000 | HITON-PC | 0.1414 | HITON-PC |
| | 0.3232 | HITON-PC | 0.3998 | HITON-PC |
| UAF-Signal2Noise-SVM: 4 variants | 0.0710 | Other | 0.0018 | HITON-PC |
| | 0.0752 | Other | 0.0030 | HITON-PC |
| | 0.4420 | HITON-PC | 0.7850 | HITON-PC |
| | 0.2820 | HITON-PC | 0.6604 | HITON-PC |
| UAF-Neal-SVM: 4 variants | 0.5046 | Other | <0.0001 | HITON-PC |
| | 0.9782 | HITON-PC | <0.0001 | HITON-PC |
| | 0.6980 | HITON-PC | 0.0044 | HITON-PC |
| | 0.3806 | HITON-PC | 0.0186 | HITON-PC |
| Random Forest Variable Selection: 2 variants | 0.6064 | HITON-PC | 0.3252 | HITON-PC |
| | 0.5050 | HITON-PC | 0.1338 | Other |
| LARS-Elastic Net: 2 variants | 1.0000 | Other | 0.1112 | HITON-PC |
| | 0.0832 | HITON-PC | 0.5216 | Other |
| RELIEF: 8 variants | 0.2032 | Other | <0.0001 | HITON-PC |
| | 0.9362 | Other | <0.0001 | HITON-PC |
| | 0.4388 | Other | 0.0014 | HITON-PC |
| | 0.8432 | Other | 0.0010 | HITON-PC |
| | 0.4290 | HITON-PC | 0.0108 | HITON-PC |
| | 0.3414 | HITON-PC | 0.0518 | HITON-PC |
| | 0.4424 | HITON-PC | 0.0706 | HITON-PC |
| | 0.2748 | HITON-PC | 0.0404 | HITON-PC |
| L0-norm | 0.0258 | HITON-PC | 0.1942 | HITON-PC |
| Forward Stepwise Selection | 0.0028 | HITON-PC | 0.2758 | Other |
| Koller-Sahami: 6 variants | 0.7506 | HITON-PC | <0.0001 | HITON-PC |
| | 0.6234 | HITON-PC | <0.0001 | HITON-PC |
| | 0.6278 | HITON-PC | <0.0001 | HITON-PC |
| | <0.0001 | HITON-PC | <0.0001 | Other |
| | 0.1278 | HITON-PC | 0.3856 | HITON-PC |
| | 0.1236 | HITON-PC | <0.0001 | HITON-PC |
| IAMB: 3 variants | <0.0001 | HITON-PC | <0.0001 | Other |
| | <0.0001 | HITON-PC | <0.0001 | Other |
| | <0.0001 | HITON-PC | 0.1202 | Other |
| K2MB | <0.0001 | HITON-PC | <0.0001 | Other |
| BLCD-MB | <0.0001 | HITON-PC | <0.0001 | Other |
| FAST-IAMB | <0.0001 | HITON-PC | <0.0001 | Other |

Figure 13

Table 7

| average semi-interleaved HITON-PC-FDR with G2 test vs. average LARS-EN | <0.0001 | HITON-PC-FDR | <0.0001 | HITON-PC-FDR | <0.0001 | HITON-PC-FDR |

Figure 14

Table S1 (continued in the next page)

| Method | Additional Information | Reference |
|---|---|---|
| No feature selection | | |
| RFE (recursive feature elimination SVM-based method) | reduction by 50% at each iteration, best performing feature subset is returned | (Guyon et al., 2002) |
| | reduction by 20% at each iteration, best performing feature subset is returned | |
| | reduction by 50% at each iteration, statistically same as best performing feature subset is returned | |
| | reduction by 20% at each iteration, statistically same as best performing feature subset is returned | |
| UAF-KruskalWallis-SVM (univariate ranking by Kruskal-Wallis statistic and feature selection with SVM backward wrapper) | reduction by 50% at each iteration, best performing feature subset is returned | (Hollander and Wolfe, 1999; Statnikov et al., 2005a) |
| | reduction by 20% at each iteration, best performing feature subset is returned | |
| | reduction by 50% at each iteration, statistically same as best performing feature subset is returned | |
| | reduction by 20% at each iteration, statistically same as best performing feature subset is returned | |
| UAF-Signal2Noise-SVM (univariate ranking by signal-to-noise statistic and feature selection with SVM backward wrapper) | reduction by 50% at each iteration, best performing feature subset is returned | (Furey et al., 2000; Guyon et al., 2006b; Statnikov et al., 2005a) |
| | reduction by 20% at each iteration, best performing feature subset is returned | |
| | reduction by 50% at each iteration, statistically same as best performing feature subset is returned | |
| | reduction by 20% at each iteration, statistically same as best performing feature subset is returned | |
| UAF-Neal-SVM (univariate ranking by Radford Neal's statistic and feature selection with SVM backward wrapper) | reduction by 50% at each iteration, best performing feature subset is returned | Chapter 10 in (Guyon et al., 2006a) |
| | reduction by 20% at each iteration, best performing feature subset is returned | |
| | reduction by 50% at each iteration, statistically same as best performing feature subset is returned | |
| | reduction by 20% at each iteration, statistically same as best performing feature subset is returned | |
| Random Forest Variable Selection (RFVS) | best performing feature subset is returned | (Breiman, 2001; Diaz-Uriarte and Alvarez de Andres, 2006) |
| | statistically same as best performing feature subset is returned | |
| LARS-Elastic Net (LARS-EN) | best performing feature subset is returned | (Zou and Hastie, 2005) |
| | statistically same as best performing feature subset is returned | |
| RELIEF (with backward wrapping by SVM) | Number of neighbors = 1, reduction by 50% at each iteration, best performing feature subset is returned | (Kira and Rendell, 1992; Kononenko, 1994) |
| | Number of neighbors = 1, reduction by 20% at each iteration, best performing feature subset is returned | |
| | Number of neighbors = 5, reduction by 50% at each iteration, best performing feature subset is returned | |
| | Number of neighbors = 5, reduction by 20% at each iteration, best performing feature subset is returned | |
| | Number of neighbors = 1, reduction by 50% at each iteration, statistically same as best performing feature subset is returned | |
| | Number of neighbors = 1, reduction by 20% at each iteration, statistically same as best performing feature subset is returned | |
| | Number of neighbors = 5, reduction by 50% at each iteration, statistically same as best performing feature subset is returned | |
| | Number of neighbors = 5, reduction by 20% at each iteration, statistically same as best performing feature subset is returned | |
| L0-norm | | (Weston et al., 2003) |
| Forward Stepwise Selection | using SVM classifier for wrapping | (Caruana and Freitag, 1994) |
| Koller-Sahami (with backward wrapping by SVM) | k=0, best performing feature subset is returned | (Koller and Sahami, 1996) |
| | k=1, best performing feature subset is returned | |
| | k=2, best performing feature subset is returned | |
| | k=0, statistically same as best performing feature subset is returned | |
| | k=1, statistically same as best performing feature subset is returned | |
| | k=2, statistically same as best performing feature subset is returned | |
| | max k=3 and α=0.01 | |

Figure 14

Table S1 *(continued from the previous page)*

| Method | Additional Information | Reference |
|---|---|---|
| IAMB | $G^2$ test and $\alpha=0.05$ | (Tsamardinos and Aliferis, 2003; Tsamardinos et al., 2003a) |
| | $G^2$ test and $\alpha=0.01$ | |
| | mutual information criterion with threshold=0.01 | |
| K2MB | | (Cooper et al., 1997; Cooper and Herskovits, 1992) |
| BLCD-MB | | (Mani and Cooper, 2004) |
| FAST-IAMB | $G^2$ test and $\alpha=0.05$ | (Yaramakala and Margaritis, 2005) |
| HITON-PC (semi-interleaved) | max k=4 and $\alpha=0.05$ | Novel method |
| | max k=3 and $\alpha=0.05$ | |
| | max k=2 and $\alpha=0.05$ | |
| | max k=1 and $\alpha=0.05$ | |
| | max k=4 and $\alpha=0.01$ | |
| | max k=3 and $\alpha=0.01$ | |
| | max k=2 and $\alpha=0.01$ | |
| | max k=1 and $\alpha=0.01$ | |
| | max k and $\alpha$ selected by cross-validation | |
| Interleaved HITON-PC | max k=4 and $\alpha=0.05$ | (Aliferis et al., 2003a) |
| | max k=3 and $\alpha=0.05$ | |
| | max k=2 and $\alpha=0.05$ | |
| | max k=1 and $\alpha=0.05$ | |
| | max k=4 and $\alpha=0.01$ | |
| | max k=3 and $\alpha=0.01$ | |
| | max k=2 and $\alpha=0.01$ | |
| | max k=1 and $\alpha=0.01$ | |
| | max k and $\alpha$ selected by cross-validation | |
| MMPC | max k=4 and $\alpha=0.05$ | (Tsamardinos et al., 2003b; Tsamardinos et al., 2006) |
| | max k=3 and $\alpha=0.05$ | |
| | max k=2 and $\alpha=0.05$ | |
| | max k=1 and $\alpha=0.05$ | |
| | max k=4 and $\alpha=0.01$ | |
| | max k=3 and $\alpha=0.01$ | |
| | max k=2 and $\alpha=0.01$ | |
| | max k=1 and $\alpha=0.01$ | |
| | max k and $\alpha$ selected by cross-validation | |
| Interleaved MMPC | max k=4 and $\alpha=0.05$ | Novel method |
| | max k=3 and $\alpha=0.05$ | |
| | max k=2 and $\alpha=0.05$ | |
| | max k=1 and $\alpha=0.05$ | |
| | max k=4 and $\alpha=0.01$ | |
| | max k=3 and $\alpha=0.01$ | |
| | max k=2 and $\alpha=0.01$ | |
| | max k=1 and $\alpha=0.01$ | |
| | max k and $\alpha$ selected by cross-validation | |
| HITON-MB (semi-interleaved) | max k=3 and $\alpha=0.05$ | Novel method |
| | max k=3 and $\alpha=0.01$ | |
| MMMB | max k=3 and $\alpha=0.05$ | (Tsamardinos et al., 2003b) |
| | max k=3 and $\alpha=0.01$ | |

Figure 15

Table S2

| Dataset name | Domain | Num. variables | Num. samples | Target | Data type | Cross-val. design | Discretization applied | Notes | Reference |
|---|---|---|---|---|---|---|---|---|---|
| Infant_Mortality | Clinical | 86 | 5,337 | Died within the first year | Discrete | 1-fold cross-val. | Already discrete | Imputed by nearest neighbor method | (Mani and Cooper, 1999) |
| Ohsumed | Text | 14,373 | 5,000 | Relevant to neonatal diseases | Continuous | 1-fold cross-val. | Word absent/present | | (Joachims, 2002) |
| ACPJ_Etiology | Text | 28,228 | 15,779 | Relevant to etiology | Continuous | 1-fold cross-val. | Word absent/present | | (Aphinyanaphongs et al., 2006) |
| Lymphoma | Gene expression | 7,399 | 227 | 3-year survival: dead vs. alive | Continuous | 10-fold cross-val. | Binary/ternary univariate; used window sizes 10, 15, 20, 25, 30 for ternary | | (Rosenwald et al., 2002) |
| Gisette | Digit recognition | 5,000 | 7,000 | Separate 4 from 9 | Continuous | 1-fold cross-val. | Pixel present/absent | Used original training & validation sets only | NIPS 2003 Feature Selection Challenge (Guyon et al., 2006a) |
| Dexter | Text | 19,999 | 600 | Relevant to corporate acquisitions | Continuous | 10-fold cross-val. | Word absent/present | Used original training & validation sets only | NIPS 2003 Feature Selection Challenge (Guyon et al., 2006a) |
| Sylva | Ecology | 216 | 14,394 | Ponderosa pine vs. everything else | Continuous & discrete | 1-fold cross-val. | Binary/ternary univariate; used window sizes 1000, 1500, 2000, 2500, 3000 for ternary | Used original training & validation sets only | WCCI 2006 Performance Prediction Challenge |
| Ovarian Cancer | Proteomics | 2,190 | 216 | Cancer vs. normals | Continuous | 10-fold cross-val. | Binary/ternary univariate; used window sizes 10, 15, 20, 25, 30 for ternary | | (Conrads et al., 2004) |
| Thrombin | Drug discovery | 139,351 | 2,543 | Binding to thrombin | Discrete (binary) | 1-fold cross-val. | Already discrete | | KDD Cup 2001 |
| Breast_Cancer | Gene expression | 17,816 | 286 | Estrogen-receptor positive (ER+) vs. ER- | Continuous | 10-fold cross-val. | Binary/ternary univariate, used window sizes 10, 15, 20, 25, 30 for ternary | | (Wang et al., 2005) |
| Hiva | Drug discovery | 1,617 | 4,229 | Activity to AIDS HIV infection | Discrete (binary) | 1-fold cross-val. | Already discrete | Used original training & validation sets only | WCCI 2006 Performance Prediction Challenge |
| Nova | Text | 16,969 | 1,929 | Separate politics from religion topics | Discrete (binary) | 1-fold cross-val. | Already discrete | Used original training & validation sets only | WCCI 2006 Performance Prediction Challenge |
| Bankruptcy | Financial | 147 | 7,063 | Personal bankruptcy | Continuous & discrete | 1-fold cross-val. | Binary/ternary univariate, used window sizes 1000, 1500, 2000, 2500, 3000 for ternary | Imputed by nearest neighbor method | (Foster and Stine, 2004) |

Figure 16

Table S3

| Bayesian network | Number of variables | Training samples | Number of selected targets |
|---|---|---|---|
| Child10 | 200 | 5 x 200, 5 x 500, 1 x 5000 | 10 |
| Insurance10 | 270 | 5 x 200, 5 x 500, 1 x 5000 | 10 |
| Alarm10 | 370 | 5 x 200, 5 x 500, 1 x 5000 | 10 |
| Hailfinder10 | 560 | 5 x 200, 5 x 500, 1 x 5000 | 10 |
| Munin | 189 | 5 x 500, 1 x 5000 | 6 |
| Pigs | 441 | 5 x 200, 5 x 500, 1 x 5000 | 10 |
| Link | 724 | 5 x 200, 5 x 500, 1 x 5000 | 10 |
| Lung_Cancer | 800 | 5 x 200, 5 x 500, 1 x 5000 | 11 |
| Gene | 801 | 5 x 200, 5 x 500, 1 x 5000 | 11 |

Figure 17

Table S4

| | |
|---|---|
| HITON-PC (max k=4) | HITON-PC-FDR (max k=4) |
| HITON-PC (max k=3) | HITON-PC-FDR (max k=3) |
| HITON-PC (max k=2) | HITON-PC-FDR (max k=2) |
| HITON-PC (max k=1) | HITON-PC-FDR (max k=1) |
| Interleaved HITON-PC (max k=4) | HITON-MB (max k=3) |
| Interleaved HITON-PC (max k=3) | MMMB (max k=3) |
| Interleaved HITON-PC (max k=2) | RFE (reduction of features by 50%) |
| Interleaved HITON-PC (max k=1) | RFE (reduction of features by 20%) |
| MMPC (max k=4) | UAF-KruskalWallis-SVM (50%) |
| MMPC (max k=3) | UAF-KruskalWallis-SVM (20%) |
| MMPC (max k=2) | UAF-Signal2Noise-SVM (50%) |
| MMPC (max k=1) | UAF-Signal2Noise-SVM (20%) |
| Interleaved MMPC (max k=4) | L0 |
| Interleaved MMPC (max k=3) | LARS-EN (for multiclass response) |
| Interleaved MMPC (max k=2) | LARS-EN (one-versus-rest) |
| Interleaved MMPC (max k=1) | |

LOCAL CAUSAL AND MARKOV BLANKET INDUCTION METHOD FOR CAUSAL DISCOVERY AND FEATURE SELECTION FROM DATA

Benefit of U.S. Provisional Application No. 61/149,758 filed on Feb. 4, 2009 is hereby claimed.

BACKGROUND OF THE INVENTION

1. Field of the Invention

In many areas, recent developments have generated very large datasets from which it is desired to extract meaningful relationships between the dataset elements. However, to date, the finding of such relationships using prior art methods has proved extremely difficult especially in the biomedically related arts. For those fields as well as others, the need for new more powerful advanced methods is critical. Methods for local causal learning and Markov blanket discovery are important recent developments in pattern recognition and applied statistics, primarily because they offer a principled solution to the variable/feature selection problem and give insight about local causal structure. As presented in a large body of literature, discovery of local causal relationships is significant because it plays a central role in causal discovery and classification, because of its scalability benefits, and because by naturally bridging causation with predictivity, it provides significant benefits in feature selection for classification (Aliferis et al., 2010a; Aliferis et al., 2010b). More specifically, solving the local causal induction problem helps understanding how natural and artificial systems work; it helps identify what interventions to pursue in order for these systems to exhibit desired behaviors; under certain assumptions, it provides minimal feature sets required for classification of a chosen response/target variable with maximum predictivity; and finally local causal discovery can form the basis of efficient methods for learning the global causal structure of all variables in the data. The present invention is a novel method to discover a Markov boundary and the set of direct causes and direct effects from data. This method has been applied to create classification computer systems in many areas, including medical diagnosis, text categorization, and others (Aliferis et al., 2010a; Aliferis et al., 2010b).

In general, the inventive method can serve two purposes: First, it can transform a dataset with many variables into a minimal reduced dataset where all variables are needed for optimal prediction of the response variable. For example, medical researchers have been trying to identify the genes for early diagnosis of complex human diseases by analyzing samples from patients and controls by gene expression microarrays. However, they have been frustrated in their attempt to identify the critical elements by the highly complex pattern of expression results obtained, often with thousands of genes that are associated with the phenotype. The invention allows transformation of the gene expression microarray dataset for thousands of genes into a much smaller dataset containing only genes that are necessary for optimal prediction of the phenotypic response variable. Second, the inventive method described herein can transform a dataset with many thousands of variables into a reduced dataset where all variables are direct causes and effects of the response variable. For example, epidemiologists are trying to identify what causes infants to die within the first year by analyzing electronic medical record and census data. However, it is challenging to find which of the many associated variables in this data are causing the death of infants. The invention allows transformation of this infant mortality dataset with many dozens of variables to a half-dozen or less of putative causes of the infant death.

The broad applicability of the invention is first demonstrated with 13 real datasets from a diversity of application domains, where the inventive method identifies Markov blankets of the response variable with larger classification accuracy and fewer features than baseline comparison methods of the prior art. The power of the invention is subsequently demonstrated in data simulated from Bayesian networks from several problem domains, where the inventive method identifies the sets of direct causes and direct effects and Markov blankets more accurately than the prior art baseline comparison methods.

2. Description of Related Art

Firm theoretical foundations of Bayesian networks were laid down by Pearl and his co-authors (Pearl, 1988). Furthermore, all local learning methods exploit either the constraint-based framework for causal discovery developed by Spirtes, Glymour, Schienes, Pearl, and Verma and their co-authors (Pearl, 2000; Pearl and Verma, 1991; Spirtes et al., 2000) or the Bayesian search-and-score Bayesian network learning framework introduced by Cooper and Herskovits (Cooper and Herskovits, 1992).

While the above foundations were introduced and developed in the span of at least the last 30 years, local learning is no more than 10 years old. Specialized Markov blanket learning methods were first introduced in 1996 by Koller (Koller and Sahami, 1996), incomplete causal methods in 1997 (Cooper, 1997), and local causal discovery methods (for targeted complete induction of direct causes and effects) were first introduced in 2002 and 2003 (Aliferis and Tsamardinos, 2002a; Tsamardinos et al., 2003b). In 1996 Koller et al. introduced a heuristic method for inducing the Markov blanket from data and tested the method in simulated, real text, and other types of data from the UCI repository (Koller and Sahami, 1996). In 1997 Cooper and colleagues introduced and applied the heuristic method K2MB for finding the Markov blanket of a target variable in the task of predicting pneumonia mortality (Cooper et al., 1997). In 1997 Cooper introduced an incomplete method for causal discovery (Cooper, 1997). The method was able to circumvent lack of scalability of global methods by returning a subset of arcs from the full network. To avoid notational confusion, it is important to point out that Cooper's method was termed LCD (local causal discovery) despite being an incomplete rather than local method as local methods are defined in the present patent document (i.e., focused on some user-specified target variable or localized region of the network). A revision of the method termed LCD2 was presented in Mani (Mani and Cooper, 1999). A Bayesian local causal discovery method that is truly local and finds the direct causal effects of a target variable was introduced in Mani (Mani and Cooper, 2004).

In 1999 Margaritis and Thrun introduced the GS method with the intent to induce the Markov blanket for the purpose of speeding up global network learning (i.e., not for feature selection) (Margaritis and Thrun, 1999). GS was the first published sound Markov blanket induction method. The weak heuristic used by GS combined with the need to condition on at least as many variables simultaneously as the Markov blanket size makes it impractical for many typical datasets since the required sample grows exponentially to the size of the Markov blanket. This in turn forces the method to stop its execution prematurely (before it identifies the complete Markov blanket) because it cannot grow the conditioning set while performing reliable tests of independence.

Evaluations of GS by its inventors were performed in datasets with a few dozen variables leaving the potential of scalability largely unexplored.

The use of such methods has grown in importance in the field of biology as researchers have tried to sort out causes of disease and understand cellular processes. In 2001 Cheng et al. applied the TPDA method (a global BN learner) (Cheng et al., 2002a) to learn the Markov blanket of the target variable in the Thrombin dataset in order to solve a prediction problem of drug effectiveness on the basis of molecular characteristics (Cheng et al., 2002b). Because TPDA could not be run with more than a few hundred variables efficiently, they pre-selected 200 variables (out of 139,351 total) using univariate filtering. Although this procedure in general will not find the true Markov blanket (because otherwise-unconnected spouses can be missed, many true parents and children may not be in the first 200 variables, and many non Markov blanket members cannot be eliminated), the resulting classifier performed very well winning the 2001 KDD Cup competition.

Friedman et al. proposed a simple Bootstrap procedure for determining membership in the Markov blanket for small sample situations (Friedman et al., 1999a). The Markov blanket in Friedman's method is to be extracted from the full Bayesian network learned by the SCA learner (Friedman et al., 1999b).

In 2002 and 2003 Tsamardinos, Aliferis, et al. presented a modified version of GS, termed IAMB and several variants of the latter that, through use of a better inclusion heuristic than GS and optional post-processing of the tentative and final output of the local method with global learners, would achieve true scalability to datasets with many thousands of variables and applicability in modest (but not very small samples) (Aliferis et al., 2002; Tsamardinos et al., 2003a). IAMB and several variants were tested both in the high-dimensional Thrombin dataset (Aliferis et al., 2002) and in datasets simulated from both existing and random Bayesian networks (Tsamardinos et al., 2003a). The former study found that IAMB scales to high-dimensional datasets. The latter study compared IAMB and its variants to GS, Koller-Sahami, and PC and concluded that IAMB variants on average yield the best results among the datasets tested.

In 2003 Tsamardinos and Aliferis presented a full theoretical analysis explaining relevance as defined by Kohavi and John (Kohavi and John, 1997) in terms of Markov blanket and causal connectivity (Tsamardinos and Aliferis, 2003). They also provided theoretical results about the strengths and weaknesses of filter versus wrapper methods, the impossibility of a universal definition of relevance, and the optimality of Markov blanket as a solution to the feature selection problem in formal terms.

The extension of SCA to create a local-to-global learning strategy was first introduced in (Aliferis and Tsamardinos, 2002b) and led to the MMHC method introduced and evaluated in (Tsamardinos et al., 2006). MMHC was shown in (Tsamardinos et al., 2006) to achieve best-of-class performance in quality and scalability compared to most state-of-the-art full causal probabilistic network learning methods.

In 2002 Aliferis et al. also introduced parallel and distributed versions of the IAMB family of methods (Aliferis et al., 2002). The early attempt to develop generative local learning methods described in this specification was made by Aliferis and Tsamardinos in 2002 for the explicit purpose of reducing the sample size requirements of IAMB-style methods (Aliferis and Tsamardinos, 2002a).

In 2003 Aliferis et al. introduced method HITON (Aliferis et al., 2003a), and Tsamardinos et al. introduced methods MMPC and MMMB (Tsamardinos et al., 2003b). These are the first concrete methods that would find sets of direct causes or direct effects and Markov blankets in a scalable and efficient manner. HITON was tested in 5 biomedical datasets spanning clinical, text, genomic, structural and proteomic data and compared against several feature selection methods with excellent results in parsimony and classification accuracy (Aliferis et al., 2003a). MMPC was tested in data simulated from human-derived Bayesian networks with excellent results in quality and scalability. MMMB was tested in the same datasets and compared to prior methods such as Koller-Sahami method and IAMB variants with superior results in the quality of Markov blankets. These benchmarking and comparative evaluation experiments provided evidence that the local learning approach held not only theoretical but also practical potential.

HITON-PC, HITON-MB, MMPC, and MMMB methods lacked so-called "symmetry correction" (Tsamardinos et al., 2006), however HITON used a wrapping post-processing that at least in principle removed this type of false positives. The symmetry correction was introduced in 2005 and 2006 by Tsamardinos et al. in the context of the introduction of MMHC (Tsamardinos et al., 2005; Tsamardinos et al., 2006). Peña et al. also published work pointing to the need for a symmetry correction in MMPC (Peña et al., 2005b).

In 2003 Frey et al. explored the idea of using decision tree induction to indirectly approximate the Markov blanket (Frey et al., 2003). Frey produced promising results, however a main problem with the method was that it requires a threshold parameter that cannot be optimized easily.

In 2004 Mani et al. introduced BLCD-MB, which resembles IAMB but uses a Bayesian scoring metric rather than conditional independence testing (Mani and Cooper, 2004). The method was applied with promising results in infant mortality data (Mani and Cooper, 2004).

A method for learning regions around target variables by recursive application of MMPC or other local learning methods was introduced in (Tsamardinos et al., 2003c). Peña et al. applied interleaved MMPC for learning regions in the domain of bioinformatics (Peña et al., 2005a).

In 2006 Gevaert et al. applied K2MB for the purpose of learning classifiers that could be used for prognosis of breast cancer from microarray and clinical data (Gevaert et al., 2006). Univariate filtering was used to select 232 genes before applying K2MB.

Other recent efforts in learning Markov blankets include the following methods: PCX, which post-processes the output of PC (Bai et al., 2004); KIAMB, which addresses some violations of faithfulness using a stochastic extension to IAMB (Peña et al., 2007); FAST-IAMB, which speeds up IAMB (Yaramakala and Margaritis, 2005); and MBFS, which is a PC-style method that returns a graph over Markov blanket members (Ramsey, 2006).

Use of Prior Methods to Understand Biological Systems:

HITON was applied in 2005 to understand physician decisions and guideline compliance in the diagnosis of melanomas (Sboner and Aliferis, 2005). HITON has been applied for the discovery of biomarkers in human cancer data using microarrays and mass spectrometry and is also implemented in the GEMS and FAST-AIMS systems for the automated analysis of microarray and mass spectrometry data respectively (Fananapazir et al., 2005; Statnikov et al., 2005b). In a recent extensive comparison of biomarker selection methods (Aliferis et al., 2006a; Aliferis et al., 2006b) it was found that HITON outperforms 16 state-of-the-art prior art representatives from all major biomarker method families in terms of combined classification performance and feature set parsimony. This evaluation utilized 9 human cancer datasets (gene expression microarray and mass spectrometry) in 10 diagnostic and outcome (i.e., survival) prediction classification tasks. In addition to the above real data, resimulation was also used to create two gold standard network structures, one re-engineered from human lung cancer data and one from yeast data. Several applications of HITON in text categorization have been published where the method was used to understand complex "black box" SVM models and convert complex models to Boolean queries usable by Boolean interfaces of Medline (Aphinyanaphongs and Aliferis, 2004), to examine the consistency of editorial policies in published journals (Aphinyanaphongs et al., 2006), and to predict drug-drug interactions (Duda et al., 2005). HITON was also compared with excellent results to manual and machine feature selection in the domain of early graft failure in patients with liver transplantations (Hoot et al., 2005).

DESCRIPTION OF THE FIGURES AND TABLES

FIG. 1 shows the Bayesian network used to trace the inventive method.

Figure 2:
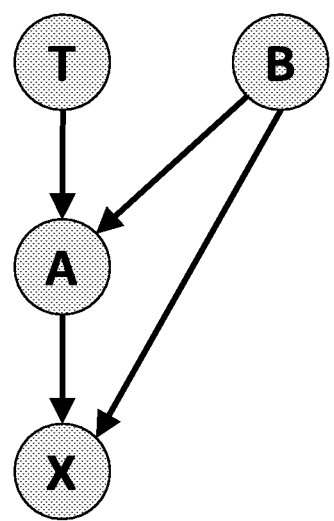

FIG. 2 shows an example Bayesian network where $PC(T) = \{A\}$, $PC(X) = \{A,B\}$, $X \notin PC(T)$. It should be noted that there is no subset of $PC(T)$ that makes T conditionally independent of X: $\neg I(X, T|\emptyset)$, $\neg I(X, T|A)$. However, there is a subset of $PC(X)$ for which X and T become conditionally independent: $I(X, T|\{A,B\})$. The Extended PC(T) is $EPC(T) = \{A, X\}$.

FIG. 3 provides a comparison of each method family with semi-interleaved HITON-PC with $G^2$ test. HITON-PC is executed with 9 different configurations: {max-k=156, α=0.05}, {max-k=256, α=0.05}, {max-k=356, α=0.05}, {max-k=456, α=0.05}, {max-k=156, α=0.01}, {max-k=256, α=0.01}, {max-k=356, α=0.01}, {max-k=456, α=0.01}, and a configuration that selects one of the above parameterizations by nested cross-validation. Results shown are averaged across all real datasets where both HITON-PC with $G^2$ test and a method family under consideration are applicable and terminate within 2 days of single-CPU time per run on a single training set. Multiple points for each method correspond to different parameterizations/configurations. The left graph has x-axis (proportion of selected features) ranging from 0 to 1 and y-axis (classification performance AUC) ranging from 0.5 to 1. The right graph has the same data, but the axes are magnified for better visualization.

FIG. 4 provides performance of feature selection methods in 9 simulated and resimulated datasets: (a) graph distance, (b) classification performance of polynomial SVM classifiers. The smaller is the value of causal graph distance and the larger is the value of classification performance, the better is the method. The results are given for training sample sizes=200, 500, and 5000. The bars denote maximum and minimum performance over multiple training samples of each size (bars are available only for sample sizes 200 and 500). The metrics reported in the figure are averaged over all datasets, selected targets, and multiple samples of each size. L0 did not terminate within 2 days (per target) for sample size 5000.

FIG. 5 provides with causal graph distance results for training sample sizes=200, 500 and 5000. The results reported in the figure are averaged over all selected targets. The smaller the number appearing in a cell, the smaller (better) value of causal graph distance; the larger the number appearing in a cell, the larger (worse) value of causal graph distance. L0 did not terminate within 2 days (per target) for sample size 5000.

Figure 6:
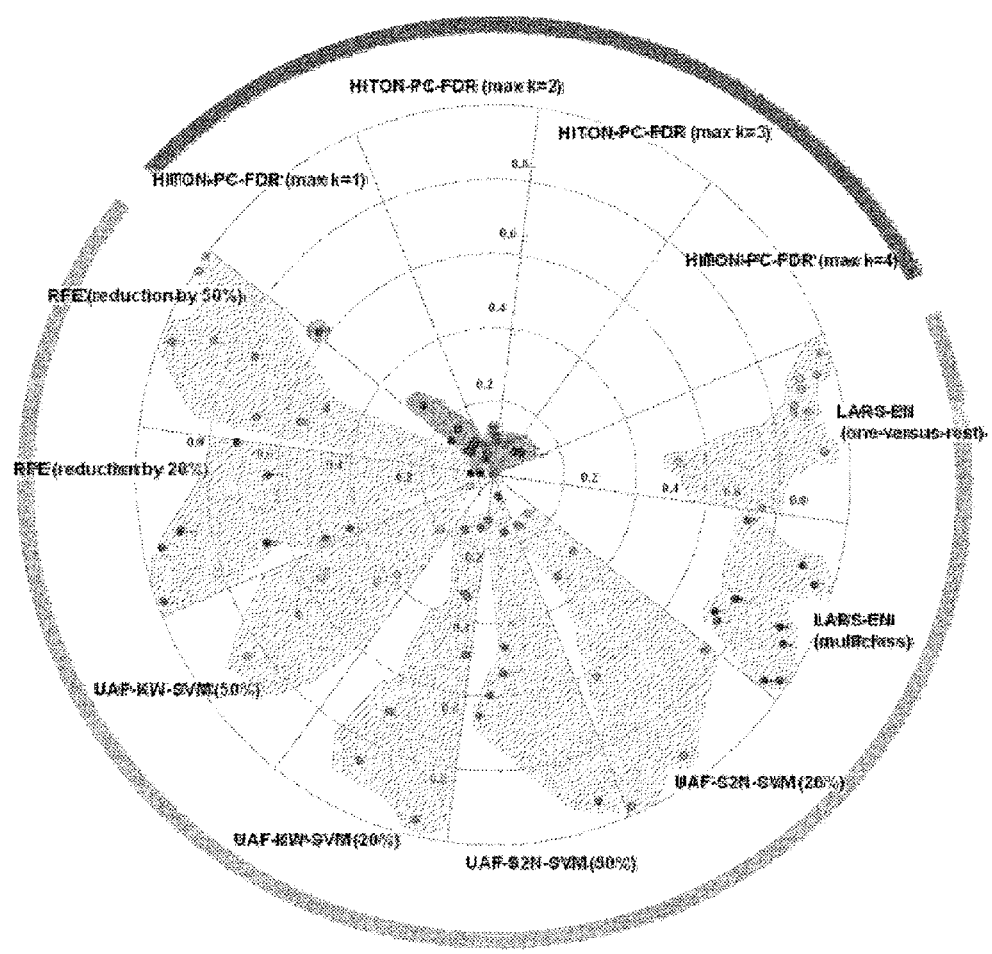

FIG. 6 shows graph distances for Insurance10 network and sample size 5000 by "bull's eye" plot. For each method, results for 10 randomly selected targets are shown. The closer the points are to the origin, the more accurate is the method for local causal discovery. Results for GLL-PC method HITON-PC-FDR are highlighted with red; results for baseline methods are highlighted with green.

FIG. 7 (Table 1) shows a high-level outline and main components (underlined) of the GLL-PC (Generalized Local Learning-Parents and Children) method.

FIG. 8 (Table 2 defines the GLL-PC admissibility rules.

FIG. 9 (Table 3) defines semi-interleaved HITON-PC with symmetry correction as an instance of GLL-PC.

FIG. 10 (Table 4) shows a trace of GLL-PC-nonsym(T) during execution of semi-interleaved HITON-PC method.

FIG. 11 (Table 5) defines the GLL-MB (Generalized Local Learning-Markov Blanket) method, a variant of GLL-PC.

FIG. 12 (Table 6) provides statistical comparison results via a permutation test (Good, 2000) of 43 prior methods (including no feature selection) to the reference GLL-PC method (semi-interleaved HITON-PC-$G^2$ optimized by cross-validation and using SVM classifier) in terms of SVM predictivity and parsimony. Each prior method compared to HITON-PC in each row is denoted by "Other". Bolded p-values are statistically significant at 5% alpha.

FIG. 13 (Table 7) provides statistical comparison between semi-interleaved HITON-PC with $G^2$ test (with and w/o FDR correction) and other methods in terms of graph distance. Bolded p-values are statistically significant at 5% alpha.

Appendix

FIG. 14 (Table S1) lists methods used in evaluation on real datasets. Whenever statistical comparison was performed inside a wrapper method, a non-parametric method by (DeLong et al., 1988) was used. The only exception is Random Forest-based Variable Selection (RFVS), where a method recommended by its authors (Diaz-Uriarte and Alvarez de Andres, 2006) was used. GLL-PC method and its variants were applied with both $G^2$ and Fisher's Z-test whenever the latter was applicable.

FIG. 15 (Table S2) lists real datasets used in evaluation of predictivity and compactness.

FIG. 16 (Table S3) lists simulated and resimulated datasets used for experiments. Lung_Cancer network is resimulated from human lung cancer gene expression data (Bhattacharjee et al., 2001) using SCA method (Friedman et al., 1999b). Gene network is resimulated from yeast cell cycle gene expression data (Spellman et al., 1998) using SCA method. More details about datasets are provided in (Tsamardinos et al., 2006).

FIG. 17 (Table S4) lists methods used in local causal discovery experiments with simulated and resimulated data.

DETAILED DESCRIPTION OF THE INVENTION

Introduction

This specification provides a description of the novel generative method for learning local causal structure and feature selection that were just published in the premier journal of machine learning, the Journal of Machine Learning Research (Aliferis et al., 2010a; Aliferis et al., 2010b). Such generative method enables a systematic exploration of a family of related but not identical specific methods which can be seen as instantiations of the same broad methodological principles encapsulated in the generative method. Also, the novel method allow a user to analyze formal conditions for correctness not only at the method level but also at the level of method family.

The following two problems of local learning are considered and the solutions provided in this patent document:

PROBLEM 1: Given a set of variables V following distribution P, a sample D drawn from P, and a target variable of interest T∈V: determine the direct causes and direct effects of T.

PROBLEM 2: Given a set of variables V following distribution P, a sample D drawn from P, and a target variable of interest T∈V: determine the direct causes, direct effects, and the direct causes of the direct effects of T.

From the work of Pearl, Spirtes, et al. (Pearl, 2000; Pearl, 1988; Spirtes et al., 2000) it is known that when the data are observational, causal sufficiency holds for the variables V, and the distribution P is faithful to a causal Bayesian network, then the direct causes, direct effects, and direct causes of the direct effects of T, correspond to the parents, children, and spouses of T respectively in that network.

Thus, in the context of the above assumptions, Problem 1 seeks to identify the parents and children set of T in a Bayesian network G faithful to P; this subset will be denoted as $PC_G(T)$. There may be several networks that faithfully capture distribution P, however, as it was shown in Tsamardinos (Tsamardinos et al., 2003b) (also directly derived from (Pearl and Verma, 1991; Pearl and Verma, 1990)) $PC_G(T)=PC_{G'}(T)$, for any two networks G and G' faithful to the same distribution. Thus, the set of parents and children of T is unique among all Bayesian networks faithful to the same distribution and therefore the subscript will be dropped and this set will be denoted simply as PC(T). It should be noted that a node may be a parent of T in one network and a child of T in another, e.g., the graphs X←T and X→T may both be faithful to the same distribution. However, the set of parents and children of T, i.e., {X}, remains the same in both networks. Finally, by Theorem 4 in Tsamardinos (Tsamardinos et al., 2003b), it is known that the Markov blanket MB(T) is unique in all networks faithful to the same distribution. Therefore, under the assumptions of the existence of a causal Bayesian network that faithfully captures P and causal sufficiency of V, the problems above can be recast as follows:

PROBLEM 1: Given a set of variables V following distribution P, a sample D drawn from P, and a target variable of interest T∈V: determine the PC(T).

PROBLEM 2: Given a set of variables V following distribution P, a sample D drawn from P, and a target variable of interest T∈V: determine the MB(T).

Problem 1 is geared toward local causal discovery, while Problem 2 is oriented toward causal feature selection for classification. The solutions to these problems can form the basis for solving several other related local discovery problems, such as learning the unoriented set of causal relations (skeleton of a Bayesian network), a region of interest of a given depth of d edges around T, or further analyze the data to discover the orientation of the causal relations. The novel method disclosed in the specification provides a solution to the above problems.

Major Components of the Invention:

At the core of invention is the generative method GLL-PC for solution of Problem 1 and approximate solution of Problem 2. The method of the invention can be modified to obtain two variants that also solve stated problems: GLL-PC-nonsym (for approximate solution of Problems 1 and 2) and GLL-MB (for solution of Problem 2). The invention also includes three novel specific instantiations of the above method and its variants:

Semi-interleaved HITON-PC-nonsym (instantiation of GLL-PC-nonsym)
Semi-interleaved HITON-PC (instantiation of GLL-PC)
Semi-interleaved HITON-MB (instantiation of GLL-MB)

As is often the case when new generative methods are introduced, some previously known methods can be derived. For instance, by instantiating the GLL-PC generative method in a specific way HITON-PC, HITON-MB (Aliferis et al., 2003a), MMPC, and MMMB (Tsamardinos et al., 2003b) can all be obtained. Most importantly, on the other hand, a plurality of previously unknown instantiations can be obtained from the generative method of the present invention. In the present specification three such specific instantiations are described: Semi-interleaved HITON-PC-nonsym, Semi-interleaved HITON-PC, and Semi-interleaved HITON-MB. These instantiations have different characteristics (in speed, quality of output, etc.) than previously known methods.

Novel method-generative frameworks capable of producing previously known methods and new previously unknown methods is a well-established problem solving approach in the field of statistical machine learning. For example, consider the invention of feed-forward neural networks which is a family of methods that can be configured to obtain perceptron, multiple regression, logistic regression, and other previously known techniques, but also complex learners previously not known (Bishop, 1995). The framework GLM (generalized linear models) can serve as a second example of generative methods which can be instantiated to generate previously known models such as linear regression, logistic regression, Poisson regression, etc., as well as novel previously unidentified regression methods (with choice of appropriate distribution family and link function) (McCullagh and Nelder, 1989). As a third example consider the family of search methods known as "best first search" which can be configured to generate known methods (e.g., A*, Branch-and-Bound, Depth-First Search, Greedy Search with backtracking, etc.) as well as a plurality of previously unknown methods by instantiating appropriate components (i.e., cost function and heuristic function) in the generative method (Russell and Norvig, 2003).

The advantage of the generative method approach is that it provides generalized criteria (often called "admissibility" criteria/rules) and generalized proofs (typically of correctness, but it may be of other properties too). Once the admissibility rules hold, the generalized proofs guarantee that the instantiated method will also have the properties entailed by the generalized proof. For example, the generalized proof of correctness for Best-first-search guarantees that when the cost function is non-decreasing and that the function that estimates the cost from the current search state to the best state is underestimated by the heuristic function, then all instantiations of best-first-search that obey this admissibility requirement will be correct (i.e., find a path from the start state to the goal state that has minimum cost among all feasible paths that connect the search with the goal states) (Russell and Norvig, 2003).

Thus a new generative method and admissibility rules as well as meta-proofs suitable for local causal discovery and feature selection from data are hereby introduced in this patent document Solving the Problem of Discovery of the Set of Direct Causes and Direct Effect:

Given the above, the components of Generalized Local Learning Parents and Children (GLL-PC) method, i.e., a generative method for PC(T) identification based on the above principles, comprise the following: first, an inclusion heuristic function to prioritize variables for consideration as members of TPC(T) and include them in TPC(T) according to established priority. The second component of the generative method is an elimination strategy, which eliminates variables from the TPC(T) set. An interleaving strategy is the third component and it iterates between inclusion and elimination until a stopping criterion is satisfied. Finally the fourth component is the check that the symmetry requirement mentioned above is satisfied. Table 1 sets forth the method details. The main method calls an internally defined subroutine that induces parents and children of T without symmetry correction (i.e., returns a set which is a subset of EPC(T) and a superset of PC(T)). In all references to TPC(T) hereafter, due to generality of the stated methods and the process of convergence of TPC(T) to PC(T), TPC(T) stands for just an approximation to PC(T).

The term "priority queue" in the schema of Table 1 indicates a data structure that satisfies the requirement that its elements are ranked by some priority function so that the highest-priority element is extracted first. TPC(T) in step 1.a of the GLL-PC-nonsym subroutine set forth in Table 1 will typically be instantiated with the empty set when no prior knowledge about membership in PC(T) exists. When the user does have prior knowledge indicating that X is a member of PC(T), TPC(T) can be instantiated to contain X. This prior knowledge may come from domain knowledge, experiments, or may be the result of running GLL-PC on variable X and finding that T is in PC(X) when conducting local-to-global learning (Tsamardinos et al., 2006).

Steps number No. 2, 3, and 4 in GLL-PC-nonsym can be instantiated in various ways. Obeying a set of specific rules generates what is called the "admissible" instantiations. These admissibility rules are given in Table 2.

THEOREM 2: When the following sufficient conditions hold:
 a. There is a causal Bayesian network faithful to the data distribution P;
 b. The determination of variable independence from the sample data D is correct;
 c. Causal sufficiency in V.
any instantiation of GLL-PC in compliance with the admissibility rules numbers 1-3 in Table 2 will return the direct causes and direct effects of T. The proof is provided in the Appendix.

It is important to note that the method schema does not address various optimizations and does not address the issue of statistical decisions in finite sample. These are discussed in (Aliferis et al., 2010a; Aliferis et al., 2010b). It is also worthwhile to note that initialization of TPC(T) in step 1(a) of the GLL-PC-nonsym function is arbitrary because correctness (unlike efficiency) of the method is not affected by the initial contents of TPC(T).

A derivative method of the generative method GLL-PC is semi-interleaved HITON-PC with symmetry correction and is taught in Table 3. Semi-interleaved HITON-PC does not perform a full variable elimination in TPC(T) with each TPC (T) expansion. On the contrary, once a new variable is selected for inclusion, it attempts to eliminate it and, if successful, it discards it without further attempted eliminations. If it is not eliminated, it is added to the end of the TPC and new candidates for inclusion are sought. Because the admissibility rules are obeyed, the method is guaranteed to be correct under the assumptions of Theorem 2.

Below it is shown that the admissibility rules are obeyed in semi-interleaved HITON-PC with symmetry under the assumptions of Theorem 2:

1. Rule No. 1 (inclusion) is obeyed because all PC(T) members have non-zero univariate association with T in faithful distributions.
2. Rule No. 2 (elimination) is directly implemented so it holds.
3. Rule No. 3 (termination) is obeyed because termination requires empty OPEN and thus eligible variables (i.e., members of PC(T)) outside TPC(T) could only be previously discarded from OPEN or TPC(T). Neither case can happen because of admissibility rules No. 1 and No. 2 respectively. Similarly all variables in TPC(T) that can be removed are removed because of admissibility rule No, 2.

Example/Descriptive Application for the Problem of Discovery of the Set of Direct Causes and Direct Effect:

A trace of the method is provided below for data coming out of the example faithful Bayesian network of FIG. 1. Consider that the task is to find parents and children of the target variable T using semi-interleaved HITON-PC with symmetry. Table 4 gives a complete trace of step 1 of the instantiated GLL-PC method, i.e. execution of GLL-PC-nonsym subroutine for variable T. The Roman numbers in the table refer to iterations of steps 2 and 3 in GLL-PC-nonsym.

Thus TPC(T)={D, E, A, B} by the end of GLL-PC-nonsym subroutine, so U={D, E, A, B} in step 1 of GLL-PC. Next, in steps 2 and 3 GLL-PC-nonsym is first run for all X∈U:
 GLL-PC-nonsym(D)→{T, F}
 GLL-PC-nonsym(E)→{T, F}
 GLL-PC-nonsym(A)→{T, G, C, B}
 GLL-PC-nonsym(B)→{A, C}
and then the symmetry requirement is verified. Since T∉GLL-PC-nonsym(B), the variable B is removed from U. Finally, the GLL-PC method returns U={D, E, A} in step 4.

Solving the Problem of Discovery of Markov Blanket (MB):

As set forth in the Appendix, the set MB(T) contains all information sufficient for the determination of the conditional distribution of T: $P(T|MB(T))=P(T|V\setminus\{T\})$ and further, it coincides with the parents, children and spouses of T in any network faithful to the distribution (if any). The previous section of this patent document described how to apply GLL-PC to obtain the PC(T) set, and so in order to find the MB(T) one needs in addition to PC(T), to also identify the spouses of T.

It is important to note that, approximating MB(T) with PC(T) and missing the spouse nodes may in theory discard very informative nodes. For example, suppose that X and T are two uniformly randomly chosen numbers in [0, 1] and that Y=min(1, X+T). Then, the only faithful network representing the joint distribution is X→Y←T, where X is the spouse of T. In predicting T, the spouse node X may reduce the uncertainty completely: conditioned on Y, T may become completely determined (when both X and T are less than 0.5). Thus, from a theoretical perspective it makes sense to develop methods that identify the spouses in addition to the PC(T).

The theorem on which the methods in this family are based to discover the MB(T) is the following:

THEOREM 3: In a faithful BN<V, G, P>, if for a triple of nodes X, T, Y in G, X∈PC(Y), Y∈PC(T), and X∉PC(T), then X→Y←T is a subgraph of G iff $\neg I(X, T|Z\cup\{Y\})$, for all Z $\subseteq V\setminus\{X,T\}$ (Spirtes et al., 2000).

Two cases can be distinguished: (i) X is a spouse of T but it is also a parent or child, e.g., X→T→Y and also X→Y. In this case, one cannot use the theorem above to identify Y as a collider and X as a spouse. But at the same time there is no need to do so: X∈PC(T) and so it will be identified by GLL-PC. (ii) X∈MB(T)\PC(T) in which case one can use the theorem to locally discover the subgraph X→Y←T and determine that X should be included in MB(T).

The GLL-MB method (as a variant of GLL-PC) is taught in Table 5. The admissibility requirement is simply to use an admissible GLL-PC instantiation.

For the identification of PC(T) any method of GLL-PC can be used. Also, at step 5a it is known that such a Z exist since X∉PC(T) (by Theorem 1); this Z has been previously determined and is cached during the call to PC(T).

THEOREM 4: When the following sufficient conditions hold
a. There is a causal Bayesian network faithful to the data distribution P;
b. The determination of variable independence from the sample data D is correct;
c. Causal sufficiency in V
any instantiation of GLL-MB in compliance with the admissibility rule will return MB(T), with no need for step 6. The proof is provided in the Appendix.

A new Markov blanket method, semi-interleaved HITON-MB, can be obtained by instantiating GLL-MB (Table 5) with the semi-interleaved HITON-PC method with symmetry correction for GLL-PC.

Semi-interleaved HITON-MB is guaranteed to be correct under the assumptions of Theorem 4, hence the only proof of correctness needed is the proof of correctness for semi-interleaved HITON-PC with symmetry (which was provided earlier).

Example/Descriptive Application for the Problem of Markov Blanket Discovery:

A trace of the semi-interleaved HITON-MB method for data coming out of the example faithful Bayesian network of the FIG. 1 follows below. The step numbers are set out in Table 5. The task is to find the Markov blanket of T. In step 1, PC(T)={D, E, A} will be identified. Then in step 2 PC(X) for all X∈PC(T) is found:

PC(D)={T, F},
PC(E)={T, F}
PC(A)={T, G, C, B}.

In step 3 TMB(T)←{D, E, A} is initialized. The set S in step 4 contains the following variables: {F, G, C, B}. In step 5 the loop over all members of S is run to find spouses of T. Each variable is considered separately below:

Loop for X=F: In step 5a, a subset Z={D, E} is retrieved that renders X=F independent of T. In step 5b, the loop over all potential common children of F and T is run, i.e. Y=D and Y=E. When Y=D is considered, X=F becomes independent of T given Z∪{Y}={D, E} and thus F is not included in TMB(T) in step 5d. When Y=E is considered, F is similarly not included in TMB(T) in step 5d.

Loop for X=G: In step 5a, a subset Z=Ø is retrieved that renders X=G independent of T. In step 5b, the loop over all potential common children of G and T is run, i.e. variable Y=A. Since X=G is dependent on T given Z∪{Y}={A}, G is included in TMB(T) in step 5d.

Loop for X=C: In step 5a, a subset Z=Ø is retrieved that renders X=C independent of T. In step 5b, the loop over all potential common children of C and T is run, i.e. variable Y=A. Since X=C is dependent on T given Z∪{Y}={A}, C is included in TMB(T) in step 5d.

Loop for X=B: In step 5a, a subset Z={A, C} is retrieved that renders X=B independent of T. In step 5b, the loop over all potential common children of B and T is run, i.e. variable Y=A. Since X=B is independent of T given Z∪{Y}={A, C}, G is not included in TMB(T) in step 5d.

By the end of step 5, TMB(T)={D, E, A, G, C}. This is the true MB(T). In step 6, wrapping is performed to remove members of TMB(T) that are redundant for classification. Assume that a backward wrapping procedure was applied and it removed the variable G, for example because omitting this variable does not increase classification loss. Thus, TMB(T)={D, E, A, C} at step 7 when the method terminates.

Constructing New Inclusion Heuristics for the GLL-PC Method:

Construction of new inclusion heuristics may be required in difficult cases in order to make operation of local learning tractable when the univariate and max-min heuristics (as employed in HITON-PC (Aliferis et al., 2003a) and MMPC (Tsamardinos et al., 2003b), respectively) do not work well leading to very slow processing time and very large TPC(T) sets. In practice, both the univariate and max-min association heuristics work very well with real and resimulated datasets, although the possibility exist of such need in future problematic data distributions. The strategies for creating new inclusion heuristics are outlined below for such cases:

1. Random heuristic search informed by standard heuristic values. This strategy is based on using one of the standard (usual) heuristics to rank candidate variables and making selection decisions based on random selection of a candidate variable with probability proportional to the standard heuristic value. This approach enables using the older heuristic as a starting point but allowing occasionally deviations from it to explore the possibility that lower-ranked candidates may have better potential as blocking variables. A simulated-annealing determination of probability of selection (or other efficient stochastic search methods) can be pursued as well.

2. Constructing new heuristic functions by observing blocking capability (in terms of candidate variables blocked by conditioning sets in which V is a member) or probability of a variable V to remain in TPC(T). The empirical observations can be collected from a variety of tractable sources: either from a single incomplete run of the method (i.e., without waiting to terminate), or in other datasets characteristic of the domain, or in multiple runs on smaller (randomly chosen) subsets of the original feature set. The new heuristic function F can be constructed as the conditional probability:

$$F(V_i)=P(V_i \in TPC(T)|h(V_i)),$$

where $h(V_i)$ is the original heuristic value of variable $V_i$, or as the proportion of candidates blocked by a conditioning set containing $V_i$:

$$F(V_i) = \sum_{k=1}^{M} N_k(V_i)/M,$$

where $N_k(V_i)$ is the number of candidate variables blocked by a conditioning set that contains variable $V_i$ in trial k.

3. Exploiting known domain structure. When properties of the causal structure of the data generating structure and/or distributional characteristics are known, one can use this information alone or in conjunction with the previous two strategies to derive more efficient heuristics.

Experimental Evaluation of the Inventive Method on Real World Data:

Here the ability of GLL-PC method and its variants to discover compact sets of features with as high classification performance as possible is examined for each real dataset, and this method compared with prior art local causal structure discovery methods as well as non-causal feature selection methods.

In order to avoid bias in error estimation, nested N-fold cross-validation is applied. The inner loop is used to try different parameters for the feature selection and classifier methods while the outer loop tests the best configuration on an independent test set. Details are given in (Dudoit and van der Laan, 2003; Scheffer, 1999; Statnikov et al., 2005b).

The evaluated methods are listed in the Appendix Table S1. They were chosen on the basis of prior independently published results showing their state-of-the-art performance and applicability to the range of domains represented in the evaluation datasets. Several versions of GLL-PC are compared, including variants to discover the parents and children (PC) set and Markov blanket (MB) inducers. Whenever a reference is made to HITON-PC method in this patent document, semi-interleaved HITON-PC without symmetry correction is assumed, unless mentioned otherwise. Also, other versions of the GLL-PC method evaluated do not have symmetry correction unless mentioned otherwise. Finally unless otherwise noted, GLL-MB does not implement a wrapping step.

Appendix Table S2 presents the evaluation datasets. The datasets were chosen on the basis of being representative of a wide range of problem domains (biology, medicine, economics, ecology, digit recognition, text categorization, and computational biology) in which feature selection is essential. These datasets are challenging since they have a large number of features with small-to-large sample sizes. Several datasets used in prior feature selection and classification challenges were included (details given in Appendix Table S2). All datasets have a single binary target variable.

To perform imputation in datasets with missing values, a non-parametric nearest neighbor method was applied (Batista and Monard, 2003). Specifically, this method imputes each missing value of a variable with the present value of the same variable in the most similar instance according to Euclidian distance metric. Discretization in non-sparse continuous datasets was performed by a univariate method (Liu et al., 2002) implemented in *Causal Explorer* toolkit (Aliferis et al., 2003b). For a given continuous variable, the method considers many binary and ternary discretization thresholds (by means of a sliding window) and chooses the one that maximizes statistical association with the target variable. In sparse continuous datasets, discretization was performed by assigning value 1 to all non-zero values. All variables in each dataset were also normalized to be in [0, 1] range to facilitate classification by SVM and KNN. All computations of statistics for the preprocessing steps were performed based on training data only to ensure unbiased classification error estimation. Statistical comparison between methods was done using two-sided permutation test (with 10,000 permutations) at 5% alpha level (Good, 2000). The null hypothesis of this test is that methods perform the same.

Both polynomial SVMs and KNN were used for building classifiers from each selected feature set. For SVMs, the misclassification cost C and kernel degree d were optimized over values [1, 10, 100] and [1, 2, 3, 4], respectively. For KNN, the number of nearest neighbors k was optimized over values [1, . . . , min(1000, number of instances in the training set)]. All optimization was conducted in nested cross-validation using training data only, while the testing data was used only once to obtain an error estimate for the final classifier. The libSVM implementation of the SVM classifiers (Fan et al., 2005) and internal implementation of KNN were used.

In all cases, when a method had not terminated within 2 days of single-CPU time per run on a single training set (including optimization of the feature selector parameters), in order to make the experimental comparison feasible with all methods and datasets in the study, the method is deemed to be impractical and terminated. While the practicality of spending up to two days of single-CPU time on a single training set can be debated, one can argue that use of methods that terminate in more than two days in practice is problematic due to the following reasons: (i) in the context of N-fold cross-validation the total running time is at least N times longer (i.e., >20 days single-CPU time); (ii) the analyst does not know whether the method will terminate within a reasonable amount of time, and (iii) when quantification of uncertainty about various parameters (e.g., estimating variance in error estimates via bootstrapping) is needed the analysis becomes prohibitive regardless of analyst flexibility and computational resources. When comparing a pair of methods only the datasets where both methods terminate within the allotted time were considered.

FIG. 3 shows a graphical comparison of each evaluated method to semi-interleaved HITON-PC (with $G^2$ test as a reference performance for GLL-PC) in the two-dimensional space defined by proportion of selected features and classification performance by SVM. The classification performance is measured by the area under ROC curve (AUC). As can be seen in the Figure, GLL-PC method and its variants typically return much more compact sets (i.e., with fewer features) than other methods. More compact results are provided by versions that induce the PC set rather than the MB for obvious reasons. Out of GLL-PC method and its variants, the most compact sets are returned when the Z-test is applicable (continuous data) compared to $G^2$ test (discrete or discretized data). However, regardless of parameterization, both GLL-PC and other local causal methods (i.e., IAMB, BLCD-MB, FAST-IAMB, K2MB) with the exception of Koller-Sahami are typically more compact than non-causal feature selection methods (i.e., univariate methods with backward wrapping, RFE, RELIEF, Random Forest-based Variable Selection, L0, and LARS-EN). Forward stepwise selection and some configurations of LARS-EN, Random Forest-based Variable Selection, and RFE are often very parsimonious, however their parsimony varies greatly across datasets. When a method variant employed statistical comparison among feature sets (in particular non-causal ones), it compactness was improved. Table 6 lists the statistical comparisons of compactness between one reference GLL-PC method (semi-interleaved HITON-PC-$G^2$ with cross-validation optimization) and 42 prior methods and variants. In 20 cases the GLL-PC reference method gives statistically significantly more compact sets compared to all other methods, in 16 cases parsimony is not statistically distinguishable, and in 6 cases HITON-PC gives less compact feature sets. These 6 cases correspond strictly to non-GLL-PC causal feature selection methods and at the expense of severe predictive suboptimality (0.06 to 0.10 AUC) relative to the reference GLL-PC method.

Compactness is only one of the two requirements for solving the feature selection problem. A maximally compact method that does not achieve optimal predictivity does not solve the feature selection problem. FIG. 3 examines the trade-off of compactness and SVM predictivity (results for KNN are similar). The best possible point for each graph is at the upper left corner. For ease of visualization the results are plotted for each method family separately. To avoid overfitting and to examine robustness of various methods to parameterization, the best performing configuration was not selected, but all of them were plotted. It should be noted that some methods did not run on all 13 real datasets (i.e., methods with Fisher's Z-test are applicable only to continuous data, while some methods did not terminate within 2 days of single-CPU time per run on a single training set). For such cases, results were plotted only for datasets where the methods were applicable and the results for HITON-PC correspond to the same datasets. As can be seen in FIG. 3, GLL-PC method and its variants dominate both other causal and non-causal feature selection methods. This is also substantiated in Table 6 that shows statistical comparisons of predictivity between the reference GLL-PC method and all 43 prior methods (including no feature selection). In 9 cases the GLL-PC reference method gives statistically significantly more predictive sets compared to all other methods, in 33 cases predictivity is not statistically distinguishable, and in 1 case GLL-PC gives less predictive feature sets (however the magnitude of the GLL-PC suboptimal predictivity is only 0.018 AUC on average, whereas the difference in compactness is more than 33% features selected on average).

The overall performance patterns of combined predictivity and parsimony are highly consistent with Markov blanket induction theory which predicts maximum compactness and optimal classification performance when using the MB. Different instantiations of the GLL-PC method give different trade-offs between predictivity and parsimony.

In conclusion, the invention of the GLL-PC reference method as disclosed in this patent document dominates most prior art feature selection methods in predictivity and compactness. Some prior art causal methods are more parsimonious than the reference GLL-PC method at the expense of severe classification suboptimality. One univariate method exhibits slightly higher predictivity but with severe disadvantage in parsimony. No feature selection method known in the prior art achieves equal or better compactness with equal or better classification performance than the method of this invention, GLL-PC.

Experimental Evaluation of the Inventive Method on Simulated Data:

Next the ability of GLL-PC method and its variants to discover local causal structure (in the form of parent and children sets and Markov blankets) is demonstrated, and this method is compared with other local structure discovery as well as non-causal feature selection methods. While many researchers apply feature selection techniques strictly to improve the cost and effectiveness of classification, in many fields researchers routinely apply feature selection in order to gain insights about the causal structure of the domain. A frequently encountered example is in bioinformatics where a plethora of feature selection methods are applied in high-throughput genomic and proteomic data to discover biomarkers suitable for new drug development, personalizing medical treatments, and orienting subsequent experimentation (Eisen et al., 1998; Holmes et al., 2000; Li et al., 2001; Zhou et al., 2002). Thus to demonstrate the superiority of the inventive method disclosed in this patent document, it is necessary to test the appropriateness of various feature selection techniques for causal discovery, not just classification.

In order to compare the performance of the tested techniques for causal discovery, data is simulated from known Bayesian networks and resimulation techniques (whereby real data is used to elicit a causal network and then data is simulated from the obtained network) are also employed (Appendix Table S3). Two resimulated networks are obtained as follows: (a) Lung_Cancer network: 799 genes and a phenotype target (cancer versus normal tissue indicator) are randomly selected from human gene expression data of (Bhattacharjee et al., 2001). Continuous gene expression data is discretized, and SCA is applied to elicit network structure. (b) Gene network: Data was obtained from a subset of variables of yeast gene expression data of (Spellman et al., 1998) that contained 800 randomly selected genes and a target variable denoting cell cycle state. Continuous gene expression data was also discretized and SCA was applied to learn network. This experimental design follows Friedman (Friedman et al., 2000). For each network, a set of targets are selected and 5 samples are generated (except for sample size 5,000 where one sample is generated) to reduce variability due to sampling. An independent sample of 5,000 instances is used for evaluation of classification performance.

The methods that were evaluated are provided in Appendix Table S4. The methods are evaluated using several metrics: graph distance (this metric calculates the average shortest unoriented graph distance of each variable returned by a method to the local neighborhood of target, normalized by the average such distance of all variables in the graph); Euclidean distance from the perfect sensitivity and specificity for discovery of local neighborhood the target variable (Tsamardinos et al., 2003b); proportion of false positives and proportion of false negatives; and classification performance using polynomial SVM and KNN classifiers.

Causal methods achieve, consistently under a variety of conditions and across all metrics employed, superior causal discovery performance than prior art non-causal feature selection methods in the experiments. FIGS. 4(a) and 5 compare semi-interleaved HITON-PC to HITON-MB, RFE, UAF, L0, and LARS-EN in terms of graph distance and for different sample sizes. Other GLL-PC instantiations such as Interleaved-HITON-PC, MMPC, and Interleaved-MMPC perform similarly to HITON-PC. HITON-PC is applied as is and also with a variable pre-filtering step such that only variables that pass a test of univariate association with the target at 5% False Discovery Rate (FDR) threshold are input into the method (Benjamini and Hochberg, 1995; Benjamini and Yekutieli, 2001).

As can be seen in FIGS. 4(a) and 5, in all samples HITON-PC variants return features closely localized near the target while HITON-MB requires relatively larger sample size to localize well. The distance is smaller as sample size grows. Methods such as univariate filtering localize features well in some datasets and badly in others. As sample size grows, localization of univariate filtering deteriorates. Methods L0, and LARS-EN exhibit a reverse-localization bias (i.e., preferentially select features away from the target). Performance of RFE varies greatly across datasets in its ability to localize features and this is independent of sample size. A "bull's eye" plot for Insurance10 dataset is provided in FIG. 6. The presented visualization example is representative of the relative performance of causal versus non-causal methods. Table 7 provides p-values (via a permutation test at 5% alpha) for the differences of localization among methods.

Despite causally wrong outputs (i.e., failing to return the Markov blanket or parents and children set), several non-causal feature selection methods achieve comparable classification performance with causal methods in the simulated data. FIG. 4(b) shows the average AUC and proportion of correct classifications. This phenomenon is related to information redundancy of features in relation to the target in non-sparse causal processes. In addition, it is facilitated by the relative insensitivity of state-of-the-art classifiers to irrelevant and redundant features. Good classification performance is thus greatly misleading as a criterion for quality of causal hypotheses generated by non-causal feature selection methods.

In conclusion, the results in the present section strongly undermine the hope prevalent in some research communities that non-causal feature selection methods can be used as good heuristics for causal discovery. The idea that non-causal feature selection can be used for causal discovery should be viewed with caution (Guyon et al., 2007). However, the inventive local learning method GLL-PC and its variants disclosed in this patent document in both simulated and resimulated experiments show significant advance over the prior art for local causal discovery.

Software and Hardware Implementation:

Due to large numbers of data elements in the datasets, which the present invention is designed to analyze, the invention is best practiced by means of a computational device. For example, a general purpose digital computer with suitable software program (i.e., hardware instruction set) is needed to handle the large datasets and to practice the method in realistic time frames. Based on the complete disclosure of the method in this patent document, software code to implement the invention may be written by those reasonably skilled in the software programming arts in any one of several standard programming languages. The software program may be stored on a computer readable medium and implemented on a single computer system or across a network of parallel or distributed computers linked to work as one. The inventors have used MathWorks Matlab® and a personal computer with an Intel Xeon CPU 2.4 GHz with 4 GB of RAM and 160 GB hard disk. In the most basic form, the invention receives on input a dataset and a response/target variable index corresponding to this dataset, and outputs a Markov blanket or the set of direct causes and direct effects (described by indices of variables in this dataset) which can be either stored in a data file, or stored in computer memory, or displayed on the computer screen. Likewise, the invention can transform an input dataset into a minimal reduced dataset that contains only variables that are needed for optimal prediction of the response variable (i.e., Markov blanket).

REFERENCES

Aliferis, C. F. et al. (2010a) Local Causal and Markov Blanket Induction for Causal Discovery and Feature Selection for Classification. Part I: Algorithms and Empirical Evaluation. *Journal of Machine Learning Research*.

Aliferis, C. F. et al. (2006a) Local regulatory-network inducing algorithms for biomarker discovery from mass-throughput datasets. *Technical Report DSL 06-05*.

Aliferis, C. F., Statnikov, A. and Massion, P. P. (2006b) Pathway induction and high-fidelity simulation for molecular signature and biomarker discovery in lung cancer using microarray gene expression data. *Proceedings of the 2006 American Physiological Society Conference "Physiological Genomics and Proteomics of Lung Disease"*.

Aliferis, C. F. et al. (2010b) Local Causal and Markov Blanket Induction for Causal Discovery and Feature Selection for Classification. Part II: Analysis and Extensions. *Journal of Machine Learning Research*.

Aliferis, C. F. and Tsamardinos, I. (2002a) Algorithms for large-scale local causal discovery and feature selection in the presence of small sample or large causal neighborhoods. *Technical Report DSL 02-08*.

Aliferis, C. F. and Tsamardinos, I. (2002b) Using Local Causal Induction to Improve Global Causal Discovery: Enhancing the Sparse Candidate Set. *Technical Report DSL 02-04*.

Aliferis, C. F., Tsamardinos, I. and Statnikov, A. (2002) Large-scale feature selection using Markov blanket induction for the prediction of protein-drug binding. *Technical Report DSL 02-06*.

Aliferis, C. F., Tsamardinos, I. and Statnikov, A. (2003a) HITON: a novel Markov blanket algorithm for optimal variable selection. *AMIA 2003 Annual Symposium Proceedings*, 21-25.

Aliferis, C. F. et al. (2003b) Causal Explorer: a causal probabilistic network learning toolkit for biomedical discovery. *Proceedings of the 2003 International Conference on Mathematics and Engineering Techniques in Medicine and Biological Sciences (METMBS)*.

Aphinyanaphongs, Y. and Aliferis, C. F. (2004) Learning Boolean queries for article quality filtering. *Medinfo 2004.*, 11, 263-267.

Aphinyanaphongs, Y., Statnikov, A. and Aliferis, C. F. (2006) A comparison of citation metrics to machine learning filters for the identification of high quality MEDLINE documents. *J. Am. Med. Inform. Assoc.*, 13, 446-455.

Bai, X. et al. (2004) PCX: Markov Blanket Classification for Large Data Sets with Few Cases. *Technical Report, Center for Automated Learning and Discovery*.

Batista, G. E. A. P. A. and Monard, M. C. (2003) An Analysis of Four Missing Data Treatment Methods for Supervised Learning. *Applied Artificial Intelligence*, 17, 519-533.

Benjamini, Y. and Hochberg, Y. (1995) Controlling the False Discovery Rate: A Practical and Powerful Approach to Multiple Testing. *Journal of the Royal Statistical Society. Series B (Methodological)*, 57, 289-300.

Benjamini, Y. and Yekutieli, D. (2001) The control of the false discovery rate in multiple testing under dependency. *Ann. Statist*, 29, 1165-1188.

Bhattacharjee, A. et al. (2001) Classification of human lung carcinomas by mRNA expression profiling reveals distinct adenocarcinoma subclasses. *Proc. Natl. Acad. Sci. U.S. A*, 98, 13790-13795.

Bishop, C. M. (1995) *Neural networks for pattern recognition*. Clarendon Press, Oxford.

Breiman, L. (2001) Random forests. *Machine Learning*, 45, 5-32.

Caruana, R. and Freitag, D. (1994) Greedy attribute selection. *Proceedings of the Eleventh International Conference on Machine Learning*, 28-36.

Cheng, J. et al. (2002a) Learning Bayesian networks from data: an information-theory based approach. *Artificial Intelligence*, 137, 43-90.

Cheng, J. et al. (2002b) KDD Cup 2001 report. *ACM SIGKDD Explorations Newsletter*, 3, 47-64.

Conrads, T. P. et al. (2004) High-resolution serum proteomic features for ovarian cancer detection. *Endocr. Relat Cancer*, 11, 163-178.

Cooper, G. F. (1997) A Simple Constraint-Based Algorithm for Efficiently Mining Observational Databases for Causal Relationships. *Data Mining and Knowledge Discovery*, 1, 203-224.

Cooper, G. F. et al. (1997) An evaluation of machine-learning methods for predicting pneumonia mortality. *Artificial Intelligence in Medicine*, 9, 107-138.

Cooper, G. F. and Herskovits, E. (1992) A Bayesian method for the induction of probabilistic networks from data. *Machine Learning*, 9, 309-347.

DeLong, E. R., DeLong, D. M. and Clarke-Pearson, D. L. (1988) Comparing the areas under two or more correlated receiver operating characteristic curves: a nonparametric approach. *Biometrics*, 44, 837-845.

Diaz-Uriarte, R. and Alvarez de Andres, S. (2006) Gene selection and classification of microarray data using random forest. *BMC Bioinformatics*, 7, 3.

Duda, S. et al. (2005) Extracting drug-drug interaction articles from MEDLINE to improve the content of drug databases. *AMIA 2005 Annual Symposium Proceedings*, 216-220.

Dudoit, S, and van der Laan, M. J. (2003) Asymptotics of cross-validated risk estimation in model selection and performance assessment. *UC Berkeley Division of Biostatistics Working Paper Series*, 126.

Eisen, M. B. et al. (1998) Cluster analysis and display of genome-wide expression patterns. *Proc. Natl. Acad. Sci. U.S. A*, 95, 14863-14868.

Fan, R. E., Chen, P. H. and Lin, C. J. (2005) Working set selection using second order information for training support vector machines. *Journal of Machine Learning Research*, 6, 1918.

Fananapazir, N. et al. (2005) Formative evaluation of a prototype system for automated analysis of mass spectrometry data. *AMIA 2005 Annual Symposium Proceedings*, 241-245.

Foster, D. P. and Stine, R. A. (2004) Variable Selecion in Data Mining: Building a Predictive Model for Bankruptcy. *Journal of the American Statistical Association*, 99, 303-314.

Frey, L. et al. (2003) Identifying Markov blankets with decision tree induction. *Proceedings of the Third IEEE International Conference on Data Mining (ICDM)*.

Friedman, N., Goldszmidt, M. and Wyner, A. (1999a) Data analysis with Bayesian networks: A bootstrap approach. *Proceedings of Uncertainty in Artificial Intelligence (UAI)*, 206-215.

Friedman, N. et al. (2000) Using Bayesian networks to analyze expression data. *J. Comput. Biol.*, 7, 601-620.

Friedman, N., Nachman, I. and Pe'er, D. (1999b) Learning Bayesian network structure from massive datasets: the "Sparse Candidate" algorithm. *Proceedings of the Fifteenth Conference on Uncertainty in Artificial Intelligence (UAI)*.

Furey, T. S. et al. (2000) Support vector machine classification and validation of cancer tissue samples using microarray expression data. *Bioinformatics*, 16, 906-914.

Gevaert, O. et al. (2006) Predicting the prognosis of breast cancer by integrating clinical and microarray data with Bayesian networks. *Bioinformatics*, 22, e184-e190.

Glymour, C. N. and Cooper, G. F. (1999) *Computation, causation, and discovery*. AAAI Press, Menlo Park, Calif.

Good, P. I. (2000) *Permutation tests: a practical guide to resampling methods for testing hypotheses*. Springer, N.Y.

Guyon, I., Aliferis, C. F. and Elisseeff, A. (2007) Causal Feature Selection. In Liu, H. and Motoda, H. (eds), *Computational Methods of Feature Selection*. Chapman and Hall.

Guyon, I. et al. (2006a) *Feature extraction: foundations and applications*. Springer-Verlag, Berlin.

Guyon, I. et al. (2006b) Feature selection with the CLOP package. Technical report, 2006, http://clopinet.com/isabelle/Projects/ETH/TM-fextract-class.pdf.

Guyon, I. et al. (2002) Gene selection for cancer classification using support vector machines. *Machine Learning*, 46, 389-422.

Hollander, M. and Wolfe, D. (1999) *Nonparametric statistical methods*. Wiley, New York, N.Y., USA.

Holmes, J. H., Durbin, D. R. and Winston, F. K. (2000) The learning classifier system: an evolutionary computation approach to knowledge discovery in epidemiologic surveillance. *Artif. Intell. Med.*, 19, 53-74.

Hoot, N. et al. (2005) Modelling liver transplant survival: comparing techniques of deriving predictor sets. *Journal of Gastrointestinal Surgery*, 9, 563.

Joachims, T. (2002) *Learning to classify text using support vector machines*. Kluwer Academic Publishers, Boston.

Kira, K. and Rendell, L. A. (1992) A practical approach to feature selection. *Proceedings of the Ninth International Workshop on Machine Learning*, 249-256.

Kohavi, R. and John, G. H. (1997) Wrappers for feature subset selection. *Artificial Intelligence*, 97, 273-324.

Koller, D. and Sahami, M. (1996) Toward optimal feature selection. *Proceedings of the International Conference on Machine Learning*, 1996.

Kononenko, I. (1994) Estimating attributes: Analysis and extensions of RELIEF. *Proceedings of the European Conference on Machine Learning*, 171-182.

Li, L. et al. (2001) Gene selection for sample classification based on gene expression data: study of sensitivity to choice of parameters of the GA/KNN method. *Bioinformatics*, 17, 1131-1142.

Liu, H. et al. (2002) Discretization: an enabling technique. *Data Mining and Knowledge Discovery*, 6, 393-423.

Mani, S. and Cooper, G. F. (1999) A Study in Causal Discovery from Population-Based Infant Birth and Death Records. *Proceedings of the AMIA Annual Fall Symposium*, 319.

Mani, S. and Cooper, G. F. (2004) Causal discovery using a Bayesian local causal discovery algorithm. *Medinfo 2004.*, 11, 731-735.

Margaritis, D. and Thrun, S. (1999) Bayesian network induction via local neighborhoods. *Advances in Neural Information Processing Systems*, 12, 505-511.

McCullagh, P. and Nelder, J. A. (1989) *Generalized linear models*. Chapman and Hall, London.

Neapolitan, R. E. (1990) *Probabilistic reasoning in expert systems: theory and algorithms*. Wiley, New York.

Pearl, J. (1988) *Probabilistic reasoning in intelligent systems: networks of plausible inference*. Morgan Kaufmann Publishers, San Mateo, Calif.

Pearl, J. (2000) *Causality: models, reasoning, and inference*. Cambridge University Press, Cambridge, U.K.

Pearl, J. and Verma, T. (1991) A Theory of Inferred Causation. *Principles of Knowledge Representation and Reasoning: Proceedings of Second International Conference*, 441-452.

Pearl, J. and Verma, T. S. (1990) Equivalence and synthesis of causal models. *Proceedings of the Sixth Conference on Uncertainty in Artificial Intelligence*, 220-227.

Peña, J., Bjorkegren, J. and Tegner, J. (2005a) Growing Bayesian network models of gene networks from seed genes. *Bioinformatics*, 21, 224-229.

Peña, J., Bjorkegren, J. and Tegner, J. (2005b) Scalable, efficient and correct learning of Markov boundaries under the faithfulness assumption. *Proceedings of the Eighth European Conference on Symbolic and Quantitative Approaches to Reasoning with Uncertainty*.

Peña, J. et al. (2007) Towards scalable and data efficient learning of Markov boundaries. *International Journal of Approximate Reasoning*, 45, 211-232.

Ramsey, J. (2006) A PC-style Markov blanket search for high-dimensional datasets. *Technical Report, CMU-PHIL-177, Carnegie Mellon University, Department of Philosophy*.

Rosenwald, A. et al. (2002) The use of molecular profiling to predict survival after chemotherapy for diffuse large-B-cell lymphoma. *N. Engl. J Med.*, 346, 1937-1947.

Russell, S. J. and Norvig, P. (2003) *Artificial intelligence: a modern approach*. Prentice Hall/Pearson Education, Upper Saddle River, N.J.

Sboner, A. and Aliferis, C. F. (2005) Modeling clinical judgment and implicit guideline compliance in the diagnosis of melanomas using machine learning. *AMIA 2005 Annual Symposium Proceedings*, 664-668.

Scheffer, T. (1999) Error estimation and model selection. Ph.D. Thesis, Technischen Universität Berlin, School of Computer Science.

Spellman, P. T. et al. (1998) Comprehensive identification of cell cycle-regulated genes of the yeast *Saccharomyces cerevisiae* by microarray hybridization. *Mol. Biol Cell*, 9, 3273-3297.

Spirtes, P., Glymour, C. N. and Scheines, R. (2000) *Causation, prediction, and search*. MIT Press, Cambridge, Mass.

Statnikov, A. et al. (2005a) A comprehensive evaluation of multicategory classification methods for microarray gene expression cancer diagnosis. *Bioinformatics*, 21, 631-643.

Statnikov, A. et al. (2005b) GEMS: a system for automated cancer diagnosis and biomarker discovery from microarray gene expression data. *Int. J. Med. Inform.*, 74, 491-503.

Tsamardinos, I. and Aliferis, C. F. (2003) Towards principled feature selection: relevancy, filters and wrappers. *Proceedings of the Ninth International Workshop on Artificial Intelligence and Statistics (AI & Stats)*.

Tsamardinos, I., Aliferis, C. F. and Statnikov, A. (2003a) Algorithms for large scale Markov blanket discovery. *Proceedings of the Sixteenth International Florida Artificial Intelligence Research Society Conference (FLAIRS)*, 376-381.

Tsamardinos, I., Aliferis, C. F. and Statnikov, A. (2003b) Time and sample efficient discovery of Markov blankets and direct causal relations. *Proceedings of the Ninth International Conference on Knowledge Discovery and Data Mining (KDD)*, 673-678.

Tsamardinos, I. et al. (2003c) Scaling-up Bayesian network learning to thousands of variables using local learning technique. *Technical Report DSL 03-02*, 12.

Tsamardinos, I., Brown L. E. and Aliferis, C. F. (2005) The Max-Min Hill-Climbing Bayesian Network Structure Learning Algorithm. *Technical report DSL-05-01*.

Tsamardinos, I., Brown, L. E. and Aliferis, C. F. (2006) The Max-Min Hill-Climbing Bayesian Network Structure Learning Algorithm. *Machine Learning*, 65, 31-78.

Wang, Y. et al. (2005) Gene-expression profiles to predict distant metastasis of lymph-node-negative primary breast cancer. *Lancet*, 365, 671-679.

Weston, J. et al. (2003) Use of the zero-norm with linear models and kernel methods. *Journal of Machine Learning Research*, 3, 1439-1461.

Yaramakala, S. and Margaritis, D. (2005) Speculative Markov Blanket Discovery for Optimal Feature Selection. *Proceedings of the Fifth IEEE International Conference on Data Mining*, 809-812.

Zhou, X., Kao, M. C. J. and Wong, W. H. (2002) Transitive functional annotation by shortest-path analysis of gene expression data. *Proceedings of the National Academy of Sciences*, 99, 12783-12788.

Zou, H. and Hastie, T. (2005) Regularization and variable selection via the elastic net. *Journal of the Royal Statistical Society Series B (Statistical Methodology)*, 67, 301-320.

APPENDIX

In this specification Bayesian networks are used as the language in which to represent data generating processes and causal relationships. Thus causal Bayesian networks are first formally defined. In a directed acyclic graph (DAG), a node A is the parent of B (B is the child of A) if there is a direct edge from A to B, A is the ancestor of B (B is the descendant of A) if there is a direct path from A to B. "Nodes", "features", and "variables" will be used interchangeably.

NOTATION: Variables are denoted with uppercase letters X, Y, Z, values with lowercase letters, x, y, z, and sets of variables or values with boldface uppercase or lowercase respectively. A "target" (i.e., response) variable is denoted as T unless stated otherwise.

DEFINITION 1: CONDITIONAL INDEPENDENCE. Two variables X and Y are conditionally independent given Z, denoted as $I(X, Y|Z)$, iff $P(X=x, Y=y|Z=z)=P(X=x|Z=z)P(Y=y|Z=z)$, for all values x, y, z of X, Y, Z respectively, such that $P(Z=z)>0$.

DEFINITION 2: BAYESIAN NETWORK $<V, G, J>$. Let V be a set of variables and J be a joint probability distribution over all possible instantiations of V. Let G be a directed acyclic graph (DAG) such that all nodes of G correspond one-to-one to members of V. It is required that for every node $A \in V$, A is probabilistically independent of all non-descendants of A, given the parents of A (i.e. Markov Condition holds). Then the triplet $<V, G, J>$ is called a Bayesian network (abbreviated as "BN"), or equivalently a belief network or probabilistic network (Neapolitan, 1990).

DEFINITION 3: OPERATIONAL CRITERION FOR CAUSATION. Assume that a variable A can be forced by a hypothetical experimenter to take values $a_i$. If the experimenter assigns values to A according to a uniformly random distribution over values of A, and then observes $P(B|A=a_i) \neq P(B|A=a_j)$ for some i and j, (and within a time window dt), then variable A is a cause of variable B (within dt).

It is worthwhile to note that randomization of values of A serves to eliminate any combined causative influences on both A and B. Also it is important to keep in mind that universally acceptable definitions of causation have eluded scientists and philosophers for centuries. Indeed the provided criterion is not a proper definition, because it examines one cause at a time (thus multiple causation can be missed), it assumes that a hypothetical experiment is feasible even when in practice this is not attainable, and the notion of "forcing" variables to take values presupposes a special kind of causative primitive that is formally undefined. Despite these limitations, the above criterion closely matches the notion of a Randomized Controlled Experiment which is a de facto standard for causation in many fields of science, and following common practice in the field (Glymour and Cooper, 1999) will serve operationally the purposes of the present specification.

DEFINITION 4: DIRECT AND INDIRECT CAUSATION. Assume that a variable A is a cause of variable B according to the operational criterion of definition 3. A is a direct cause for B with respect to a set of variables V, iff A passes the operational criterion for causation for every joint instantiation of variables $V \setminus \{A, B\}$, otherwise A is an indirect cause of B.

DEFINITION 5: CAUSAL PROBABILISTIC NETWORK (A.K.A. CAUSAL BAYESIAN NETWORK). A causal probabilistic network (abbreviated as "CPN") $<V, G, J>$ is the Bayesian network $<V, G, J>$ with the additional semantics that if there is an edge $A \rightarrow B$ in G then A directly causes B (for all A, $B \in V$) (Spirtes et al., 2000).

DEFINITION 6: FAITHFULNESS. A graph G is faithful to a joint probability distribution J over variable set V if and only if every independence present in J is entailed by G and the Markov Condition. A distribution J is faithful if and only if there exists a graph G such that G is faithful to J (Glymour and Cooper, 1999; Spirtes et al., 2000).

In a CPN C it follows (from the Markov Condition) that every conditional independence entailed by the graph G is also present in the probability distribution J encoded by C. Thus, together faithfulness and the causal Markov Condition establish a close relationship between a causal graph G and some empirical or theoretical probability distribution J. Hence statistical properties of the sample data can be associated with causal properties of the graph of the CPN. The d-separation criterion determines all independencies entailed by the Markov Condition and a graph G.

DEFINITION 7: D-SEPARATION, D-CONNECTION. A collider on a path p is a node with two incoming edges that belong to p. A path between X and Y given a conditioning set Z is open, if (i) every collider of p is in Z or has a descendant in Z, and (ii) no other nodes on p are in Z. If a path is not open, then it is blocked. Two variables X and Y are d-separated given a conditioning set Z in a BN or CPN C if and only if every path between X, Y is blocked (Pearl, 1988).

PROPERTY 1: Two variables X and Y are d-separated given a conditioning set Z in a faithful BN or CPN if and only if $I(X, Y|Z)$ (Spirtes et al., 2000). It follows, that if they are d-connected, they are conditionally dependent.

Thus, in a faithful CPN, d-separation captures all conditional dependence and independence relations that are encoded in the graph.

DEFINITION 8: MARKOV BLANKET OF T, DENOTED AS MB(T). A set MB(T) is a minimal set of features with the following property: for every variable subset S with no variables in MB(T), $I(S, T|MB(T))$. In Pearl's terminology this is called the Markov boundary (Pearl, 1988).

PROPERTY 2: The MB(T) of any variable T in a faithful BN or a CPN is unique (and thus also a minimum set with the Markov blanket properties) (Tsamardinos et al., 2003b) (also directly derived from (Pearl and Verma, 1991; Pearl and Verma, 1990)).

PROPERTY 3: The MB(T) in a faithful CPN is the set of parents, children, and parents of children (i.e. "spouses") of T (Pearl, 2000; Pearl, 1988).

DEFINITION 9: CAUSAL SUFFICIENCY. For every pair of measured variables in the training data, all their common causes are also measured.

DEFINITION 10: FEATURE SELECTION PROBLEM. Given a sample S of instantiations of variable set V drawn from distribution D, a classifier induction method C and a loss function L, find: smallest subset of variables $F \subseteq V$ such that F minimizes expected loss L(M, D) in distribution D where M is the classifier model (induced by C from sample S projected on F).

In the above definition, "exact" minimization of L(M,D) is assumed. In other words, out of all possible subsets of variable set V, the subsets $F \subseteq V$ that satisfy the following two criteria are of interest: (i) F minimizes L(M,D) and (ii) there is no subset $F^* \subseteq V$ such that $|F^*|<|F|$ and $F^*$ also minimizes L(M,D).

DEFINITION 11: WRAPPER FEATURE SELECTION METHOD. A method that tries to solve the Feature Selection problem by searching in the space of feature subsets and evaluating each one with a user-specified classifier and loss function estimator.

DEFINITION 12: FILTER FEATURE SELECTION METHOD. A method designed to solve the Feature Selection problem by looking at properties of the data and not by applying a classifier to estimate expected loss for different feature subsets.

DEFINITION 13: CAUSAL FEATURE SELECTION METHOD. A method designed to solve the Feature Selection problem by (directly or indirectly) inducing causal structure and by exploiting formal connections between causation and predictivity.

DEFINITION 14: NON-CAUSAL FEATURE SELECTION METHOD. A method that tries to solve the Feature Selection problem without reference to the causal structure that underlies the data.

DEFINITION 15: IRRELEVANT, STRONGLY RELEVANT, WEAKLY RELEVANT, RELEVANT FEATURE (WITH RESPECT TO TARGET VARIABLE 7). A variable set V that conditioned on every subset of the remaining variables does not carry predictive information about T is irrelevant to T. Variables that are not irrelevant are called relevant. Relevant variables are strongly relevant if they are predictive for T given the remaining variables, while a variable is weakly relevant if it is non-predictive for T given the remaining variables (i.e., it is not strongly relevant) but it is predictive given some subset of the remaining variables.

DEFINITION 16: The Extended PC(T), denoted as EPC(T), is the set PC(T) union the set of variables X for which $\neg I(X, T|Z)$, for all $Z \subseteq PC(T)\setminus\{X\}$. FIG. 2 provides an example of this definition.

THEOREM 1: In a faithful BN<V, G, P> there is an edge between the pair of nodes $X \in V$ and $Y \in V$ iff $\neg I(X, Y|Z)$, for all $Z \subseteq V\setminus\{X, Y\}$ (Spirtes et al., 2000).

PROOF OF THEOREM 2: Consider the method in Table 1. First notice, that as it was mentioned above, when conditions (a) and (c) hold the direct causes and direct effects of T will coincide with the parents and children of T in the causal Bayesian network G that faithfully captures the distribution (Spirtes et al., 2000). As it was shown in (Tsamardinos et al., 2003b), the $PC_G(T)=PC(T)$ is unique in all networks faithfully capturing the distribution.

First it is shown that the method will terminate, that is that the termination criterion of admissibility rule #3 will be met. The criterion requires that no variable eligible for inclusion will fail to enter TPC(T) and that no variable that can be eliminated from TPC(T) is left inside. Indeed because (a) due to admissibility rule No. 1 all eligible variables in OPEN are identified, (b) V is finite and OPEN instantiated to $V\setminus\{T\}$, and (c) termination will not happen before all eligible members of OPEN are moved from OPEN to TPC(T), the first part of the termination criterion will be satisfied. The second part of the termination criterion will also be satisfied because of admissibility rule No. 2 which examines for removal all variables and discards the ones that can be removed.

LEMMA 1: The output of GLL-PC-nonsym TPC(T) is such that: $PC(T) \subseteq TPC(T) \subseteq EPC(T)$.

PROOF: Assume that $X \in PC(T)$ and show that $X \in TPC(T)$ by the end of GLL-PC-nonsym. By admissibility rule No. 3, X will never fail to enter TPC(T) by the end of GLL-PC-nonsym. By Theorem 1, for all $Z \subseteq V\setminus\{X\}$, $\neg I(X, T|Z)$ and so the elimination strategy because of admissibility rule No. 2 will never remove X from TPC(T) by the end of GLL-PC-nonsym.

Now, assume that $X \in TPC(T)$ by the end of GLL-PC-nonsym and show that $X \in EPC(T)$. Assume the opposite, i.e., that $X \notin EPC(T)$ and so by definition $I(X, T|Z)$, for some $Z \subseteq PC(T)\setminus\{X\}$. By the same argument as in the previous paragraph, it is known that at some point before termination of the method, at step 4, TPC(T) will contain the PC(T). Since $X \notin EPC(T)$, the elimination strategy will find that $I(X, T|Z)$, for some $Z \subseteq PC(T)\setminus\{X\}$ and remove X from TPC(T) contrary to what was assumed. Thus, X∈EPC(T) by the end of GLL-PC-nonsym. □

LEMMA 2: If X∈EPC(T)\PC(T), then T∉EPC(X)\PC(X)

PROOF: Assume that X∈EPC(T)\PC(T). For every network G faithful to the distribution P Parents$_G$(T)⊆PC$_G$(T) =PC(T). X has to be a descendant of T in every network G faithful to the distribution because if it is not a descendant, then there is a subset Z of T's parents s.t., I(X, T|Z) (by the Markov Condition). Since X∈EPC(T)\PC(T), it is known that by definition ¬I(X, T|Z), for all Z⊆PC(T)\{X}. By the same argument, if also T∈EPC(X)\PC(X), T would have to be a descendant of X in the every network G which is impossible since the networks are acyclic. So, T∉EPC(X)\PC(X).□

Assume that X∈PC(T). By Lemma 1, X∈TPC(T) by the end of GLL-PC-nonsym. Since also T∈PC(X), substituting X for T, by the end of GLL-PC-nonsym, T∈TPC(X). So, X will not be removed from U by the symmetry requirement of GLL-PC either, and will be in the final output of the method.

Conversely, assume that X∉PC(T) and show X∉U at termination of method GLL-PC. If X never enters TPC(T) by the inclusion heuristic, the proof is done. Similarly, if X enters but is later removed from TPC(T) by the exclusion strategy, the proof is done too. So, assume that X enters TPC(T) at some point and by the end of GLL-PC-nonsym(T) is not removed by the exclusion strategy. By Lemma 1, by the end of GLL-PC-nonsym, X∈EPC(T) and since X∉PC(T) was assumed, X∈EPC(T)\PC(T). By Lemma 2, T∉EPC(X)\PC(X). Since also T∉PC(X), T∉EPC(X). Step 3 of GLL-PC will thus eliminate X from U.□

PROOF OF THEOREM 4: Since faithful Bayesian networks are assumed, d-separation in the graph of such a network is equivalent to independence and can be used interchangeably (Spirtes et al., 2000).

If X∈MB(T), it will be shown X∈TMB(T) in the end. If X∈MB(T) and X∈PC(T), it will be included in the TMB(T) in step 3, will not be removed afterwards and will be included in the final output.

If X∈MB(T)\PC(T) then X will be included in S since if X is a spouse of T, there exists Y (by definition of spouse) s.t., X∈PC(Y), Y∈PC(T) and X∉PC(T). For that Y, by Theorem 3 it is known that ¬I(X, T|Z∪{Y}), for all Z⊆V\{X,T} and so the test at step 5c will succeed and X will be included in TMB(T) in the end.

Conversely, if X∉MB(T) it will be shown that X∉TMB(T) by the end of the method. Let Z be the subset at step 5a, s.t., I(X, T|Z)) (i.e. Z d-separates X and T). Then, Z blocks all paths from X to T. For the test at step 5c to succeed a node Y must exist that opens a new path, previously closed by Z, from X to T. Since by conditioning on an additional node a path opens, Y has to be a collider (by the d-separation definition) or a descendant of a collider on a path from X to T. In addition, this path must have length two edges since all nodes in S are the parents and children of the PC(T) but without belonging in PC(T). Thus, for the test at step 5c to succeed there has to be a path of length two from X to T with a collider in-between, i.e., X has to be a spouse of T. Since X∉MB(T) the test will fail for all Y and X∉TMB(T) by the end of the method. □

We claim:

1. A computer-implemented method termed GLL-PC for finding a set of direct causes and direct effects of the response/target variable or for finding a Markov blanket of the response/target variable for local causal discovery or feature selection, said method comprising the following steps all of which are performed on a computer:
   1) find an approximation of the set of direct causes and direct effects of response variable T using the following steps:
      a) initialize a set of candidates to be a subset of all variables minus the response variable T;
      b) initialize a priority queue of variables to be examined for inclusion in the candidates set from the remaining variables;
      c) apply a user-provided inclusion heuristic function to prioritize variables in the priority queue for inclusion in the candidates set;
      d) remove non-eligible variables from the priority queue;
      e) insert in the candidates set the highest-priority variable(s) in the priority queue and remove them from the priority queue;
      f) apply a user-provided elimination strategy to remove variables from the candidates set;
      g) iterate among the inclusion, prioritization and elimination steps c, d, e and f according to a user-provided interleaving strategy until a termination criterion is met; variables may be re-ranked after each update of the candidate set, or the original ranking may be used throughout the method's operation;
   2) store the candidate set resulting from step (1) in PC$_T$;
   3) for every variable $X_i$ belonging in PC$_T$, apply step (1) designating $X_i$ as the response variable;
   4) for every variable $X_i$ belonging in PC$_T$, if the response variable T is not in the output of step (3) for the response variable $X_i$, then eliminate $X_i$ from PC$_T$; and
   5) output the set PC$_T$.

2. The computer-implemented method of claim 1 in which:
   a) step (1.c) applies an inclusion heuristic function that satisfies the following requirements:
      (i) all variables that are direct causes or direct effects of the response variable T are eligible for inclusion in the candidate set, and each such variable is assigned a non-zero value by the heuristic function;
      (ii) variables with zero values are discarded and never considered again;
   b) step (1.f) applies an elimination strategy that satisfies the following requirements: all and only variables that are probabilistically independent of the response variable T given any subset of the candidate set are discarded and never considered again (whether they are inside or outside the candidate set); and
   c) step (1.g) iterates inclusion and elimination any number of times provided that iterating stops when the following criterion is satisfied: at termination no variable outside the candidates is eligible for inclusion and no variable in the candidates set can be removed at termination.

3. The computer-implemented method of claim 1 in which step (1.c) applies the inclusion heuristic function implemented using one of the following methods:
   a) based on random search over values of standard heuristics;
   b) based on observed probability of a variable to remain in the candidate set after conditioning on many subsets of variables;
   c) based on known structure of the data generating process and/or distributional characteristics.

4. A computer-implemented method termed GLL-PC-nonsym for finding a set of direct causes and direct effects of the response/target variable or for finding a Markov blanket of the response/target variable for local causal discovery or feature selection, said method comprising the following steps all of which are performed on a computer:
   1) find an approximation of the set of direct causes and direct effects of response variable T using the following steps:

a) initialize a set of candidates to be a subset of all variables minus the response variable T;
b) initialize a priority queue of variables to be examined for inclusion in the candidates set from the remaining variables;
c) apply a user-provided inclusion heuristic function to prioritize variables in the priority queue for inclusion in the candidates set;
d) remove non-eligible variables from the priority queue;
e) insert in the candidates set the highest-priority variable(s) in the priority queue and remove them from the priority queue;
f) apply a user-provided elimination strategy to remove variables from the candidates set;
g) iterate among the inclusion, prioritization and elimination steps c, d, e and f according to a user-provided interleaving strategy until a termination criterion is met; variables may be re-ranked after each update of the candidate set, or the original ranking may be used throughout the method's operation;

2) store the candidate set resulting from step (1) in $PC_T$; and 3) output the set $PC_T$.

5. The computer-implemented method of claim 4 in which:
a) step (1.c) applies an inclusion heuristic function that satisfies the following requirements:
  (i) all variables that are direct causes or direct effects of the response variable T are eligible for inclusion in the candidate set, and each such variable is assigned a non-zero value by the heuristic function;
  (ii) variables with zero values are discarded and never considered again;
b) step (1.f) applies an elimination strategy that satisfies the following requirements: all and only variables that are probabilistically independent of the response variable T given any subset of the candidate set are discarded and never considered again (whether they are inside or outside the candidate set); and
c) step (1.g) iterates inclusion and elimination any number of times provided that iterating stops when the following criterion is satisfied: at termination no variable outside the candidates is eligible for inclusion and no variable in the candidates set can be removed at termination.

6. The computer implemented method of claim 4 in which step (1.c) applies the inclusion heuristic function implemented using one of the following methods:
a) based on random search over values of standard heuristics;
b) based on observed probability of a variable to remain in the candidate set after conditioning on many subsets of variables;
c) based on known structure of the data generating process and/or distributional characteristics.

7. A computer-implemented method termed GLL-MB for finding a Markov blanket of the response/target variable for local causal discovery or feature selection, said method comprising the following steps all of which are performed on a computer:

1) find an approximation of the set of direct causes and direct effects of response variable T using the following steps:
a) initialize a set of candidates to be a subset of all variables minus the response variable T;
b) initialize a priority queue of variables to be examined for inclusion in the candidates set from the remaining variables;
c) apply a user-provided inclusion heuristic function to prioritize variables in the priority queue for inclusion in the candidates set;
d) remove non-eligible variables from the priority queue;
e) insert in the candidates set the highest-priority variable(s) in the priority queue and remove them from the priority queue;
f) apply a user-provided elimination strategy to remove variables from the candidates set;
g) iterate among the inclusion, prioritization and elimination steps c, d, e and f according to a user-provided interleaving strategy until a termination criterion is met; variables may be re-ranked after each update of the candidate set, or the original ranking may be used throughout the method's operation;

2) store the candidate set resulting from step (1) in $PC_T$;
3) for every variable $X_i$ belonging in $PC_T$, apply step (1) designating $X_i$ as the response variable;
4) for every variable $X_i$ belonging in $PC_T$, if the response variable T is not in the output of step (3) for the response variable $X_i$, then eliminate $X_i$ from $PC_T$;
5) for every variable Y that belongs to $PC_T$, run steps (1)-(4) to obtain the sets $PC_Y$;
6) initialize the set of candidate Markov blanket variables $MB_T$ of the response variable T with $PC_T$;
7) initialize the set of potential spouses that are not direct causes and effects of T (S) with the union of variables in $PC_Y$ (over all Y belonging to $PC_T$) excluding the response variable T and the set $PC_T$;
8) eliminate non-spouses of T from S by applying the following steps for every variable X in S:
  a) retrieve or obtain a subset Z that makes X probabilistically independent of the response variable T variable given Z;
  b) for every variable Y that belongs to $PC_T$ such that X belongs to $PC_Y$, implying that Y is a potential common child of T and X: If the response variable T is not probabilistically independent from X given the union of Z and Y then conclude that X is a spouse of the response variable T and insert X into the set of candidate Markov blanket members of the response variable T ($MB_T$);
9) optionally: eliminate from $MB_T$ variables that are predictively redundant for the response variable T using one of many established backward wrapper approaches; and
10) output the set $MB_T$.

8. The computer-implemented method of claim 7 in which:
a) step (1.c) applies an inclusion heuristic function that satisfies the following requirements:
  (i) all variables that are direct causes or direct effects of the response variable T are eligible for inclusion in the candidate set, and each such variable is assigned a non-zero value by the heuristic function;
  (ii) variables with zero values are discarded and never considered again;
b) step (1.f) applies an elimination strategy that satisfies the following requirements: all and only variables that are probabilistically independent of the response variable T given any subset of the candidate set are discarded and never considered again (whether they are inside or outside the candidate set); and
c) step (1.g) iterates inclusion and elimination any number of times provided that iterating stops when the following criterion is satisfied: at termination no variable outside the candidates is eligible for inclusion and no variable in the candidates set can be removed at termination.

9. The computer-implemented method of claim 7 in which step (1.c) applies the inclusion heuristic function implemented using one of the following methods:
   a) based on random search over values of standard heuristics;
   b) based on observed probability of a variable to remain in the candidate set after conditioning on many subsets of variables;
   c) based on known structure of the data generating process and/or distributional characteristics.

10. The computer-implemented method of claim 1 or 4 or 7 for selecting features in a dataset for classification/regression modeling.

11. The computer-implemented method of claim 1 or 4 or 7 where in step 1.b) the propriety queue is initialized with variables that pass the False Discovery Rate filter.

12. The computer-implemented method of claim 1 or 4 or 7 executed in a distributed or parallel fashion in a set of digital computers or CPUs such that computational operations are distributed among different computers or CPUs.

13. A computer system comprising hardware and associated software for finding a set of direct causes and direct effects of the response/target variable or for finding a Markov blanket of the response/target variable for local causal discovery or feature selection, said system comprising the performance of the following steps:
   1) find an approximation of the set of direct causes and direct effects of response variable T using the following steps:
      a) initialize a set of candidates to be a subset of all variables minus the response variable T;
      b) initialize a priority queue of variables to be examined for inclusion in the candidates set from the remaining variables;
      c) apply a user-provided inclusion heuristic function to prioritize variables in the priority queue for inclusion in the candidates set;
      d) remove non-eligible variables from the priority queue;
      e) insert in the candidates set the highest-priority variable(s) in the priority queue and remove them from the priority queue;
      f) apply a user-provided elimination strategy to remove variables from the candidates set;
      g) iterate among the inclusion, prioritization and elimination steps c, d, e and f according to a user-provided interleaving strategy until a termination criterion is met; variables may be re-ranked after each update of the candidate set, or the original ranking may be used throughout the method's operation;
   2) store the candidate set resulting from step (1) in $PC_T$;
   3) for every variable $X_i$ belonging in $PC_T$, apply step (1) designating $X_i$ as the response variable;
   4) for every variable $X_i$ belonging in $PC_T$, if the response variable T is not in the output of step (3) for the response variable $X_i$, then eliminate $X_i$ from $PC_T$; and
   5) output the set $PC_T$.

14. A computer implemented method for transformation of a dataset with many variables into a reduced dataset with variables in the set of direct causes and direct effects of the response/target variable or Markov blanket of the response/target variable, said method comprising the following steps:
   1) find an approximation of the set of direct causes and direct effects of response variable T using the following steps:
      a) initialize a set of candidates to be a subset of all variables minus the response variable T;
      b) initialize a priority queue of variables to be examined for inclusion in the candidates set from the remaining variables;
      c) apply a user-provided inclusion heuristic function to prioritize variables in the priority queue for inclusion in the candidates set;
      d) remove non-eligible variables from the priority queue;
      e) insert in the candidates set the highest-priority variable(s) in the priority queue and remove them from the priority queue;
      f) apply a user-provided elimination strategy to remove variables from the candidates set;
      g) iterate among the inclusion, prioritization and elimination steps c, d, e and f according to a user-provided interleaving strategy until a termination criterion is met; variables may be re-ranked after each update of the candidate set, or the original ranking may be used throughout the method's operation;
   2) store the candidate set resulting from step (1) in $PC_T$;
   3) for every variable $X_i$ belonging in $PC_T$, apply step (1) designating $X_i$ as the response variable;
   4) for every variable $X_i$ belonging in $PC_T$, if the response variable T is not in the output of step (3) for the response variable $X_i$, then eliminate $X_i$ from $PC_T$; and
   5) output the set $PC_T$.

15. A computer-implemented method (referred to as Semi-interleaved HITON-PC in the specification) for finding a set of direct causes and direct effects of the response/target variable or for finding a Markov blanket of the response/target variable for local causal discovery or feature selection, said method comprising the following steps all of which are performed on a computer:
   1) find an approximation of the set of direct causes and direct effects of response variable T using the following steps:
      a) initialize the candidates set with an empty set;
      b) initialize a priority queue of variables to be examined for inclusion in the candidates set from the remaining variables;
      c) apply the following inclusion heuristic function:
         (i) sort in descending order the variables in the priority queue according to their pairwise association with the response variable T;
         (ii) remove from the priority queue variables with zero association with the response variable T;
         (iii) insert in the candidates set the first variable in the priority queue and remove it from the priority queue;
      d) apply the following elimination strategy:
         (i) if the priority queue is empty then remove every member of the candidates set that is probabilistically independent of the response variable T given a subset of the remaining variables in the candidates set;
         (ii) if the priority queue is not empty, then if the last variable that entered the candidates set is probabilistically independent from the response variable T given at least one subset of the rest of the candidates set variables, then remove this variable from the candidates set; and
      e) apply the following interleaving strategy: repeat inclusion and elimination steps until the priority queue is empty;
   2) store the candidate set resulting from step (1) in $PC_T$;
   3) for every variable $X_i$ belonging in $PC_T$, apply step (1) designating $X_i$ as the response variable;

4) for every variable $X_i$ belonging in $PC_T$, if the response variable T is not in the output of step (3) for the response variable $X_i$, then eliminate $X_i$ from $PC_T$; and
5) output the set $PC_T$.

16. A computer-implemented method (referred to as Semi-interleaved HITON-PC-nonsym in the specification) for finding a set of direct causes and direct effects of the response/target variable or for finding a Markov blanket of the response/target variable for local causal discovery or feature selection, said method comprising the following steps all of which are performed on a computer:
   1) find an approximation of the set of direct causes and direct effects of response variable T using the following steps:
      a) initialize the candidates set with an empty set;
      b) initialize a priority queue of variables to be examined for inclusion in the candidates set from the remaining variables;
      c) apply the following inclusion heuristic function:
         (i) sort in descending order the variables in the priority queue according to their pairwise association with the response variable T;
         (ii) remove from the priority queue variables with zero association with the response variable T;
         (iii) insert in the candidates set the first variable in the priority queue and remove it from the priority queue;
      d) apply the following elimination strategy:
         (i) if the priority queue is empty then remove every member of the candidates set that is probabilistically independent of the response variable T given a subset of the remaining variables in the candidates set;
         (ii) if the priority queue is not empty, then if the last variable that entered the candidates set is probabilistically independent from the response variable T given at least one subset of the rest of the candidates set variables, then remove this variable from the candidates set; and
      e) apply the following interleaving strategy: repeat inclusion and elimination steps until the priority queue is empty;
   2) store the candidate set resulting from step (1) in $PC_T$; and
   3) output the set $PC_T$.

17. A computer-implemented method (referred to as Semi-interleaved HITON-MB in the specification) for finding a Markov blanket of the response/target variable for local causal discovery or feature selection, said method comprising the following steps all of which are performed on a computer:
   1) find an approximation of the set of direct causes and direct effects of response variable T using the following steps:
      a) initialize the candidates set with an empty set;
      b) initialize a priority queue of variables to be examined for inclusion in the candidates set from the remaining variables;
      c) apply the following inclusion heuristic function:
         (i) sort in descending order the variables in the priority queue according to their pairwise association with the response variable T;
         (ii) remove from the priority queue variables with zero association with the response variable T;
         (iii) insert in the candidates set the first variable in the priority queue and remove it from the priority queue;
      d) apply the following elimination strategy:
         (i) if the priority queue is empty then remove every member of the candidates set that is probabilistically independent of the response variable T given a subset of the remaining variables in the candidates set;
         (ii) if the priority queue is not empty, then if the last variable that entered the candidates set is probabilistically independent from the response variable T given at least one subset of the rest of the candidates set variables, then remove this variable from the candidates set; and
      e) apply the following interleaving strategy: repeat inclusion and elimination steps until the priority queue is empty;
   2) store the candidate set resulting from step (1) in $PC_T$;
   3) for every variable $X_i$ belonging in $PC_T$, apply step (1) designating $X_i$ as the response variable;
   4) for every variable $X_i$ belonging in $PC_T$, if the response variable T is not in the output of step (3) for the response variable $X_i$, then eliminate $X_i$ from $PC_T$;
   5) for every variable Y that belongs to $PC_T$, run steps (1)-(4) to obtain the sets $PC_Y$;
   6) initialize the set of candidate Markov blanket variables $MB_T$ of the response variable T with $PC_T$;
   7) initialize the set of potential spouses that are not direct causes and effects of T (S) with the union of variables in $PC_Y$ (over all Y belonging to $PC_T$) excluding the response variable T and the set $PC_T$;
   8) eliminate non-spouses of T from S by applying the following steps for every variable X in S:
      a) retrieve or obtain a subset Z that makes X probabilistically independent of the response variable T variable given Z;
      b) for every variable Y that belongs to $PC_T$ such that X belongs to $PC_Y$, implying that Y is a potential common child of T and X: If the response variable T is not probabilistically independent from X given the union of Z and Y then conclude that X is a spouse of the response variable T and insert X into the set of candidate Markov blanket members of the response variable T ($MB_T$);
   9) optionally: eliminate from $MB_T$ variables that are predictively redundant for the response variable T using one of many established backward wrapper approaches; and
   10) output the set $MB_T$.

18. A computer system comprising hardware and associated software for finding a Markov blanket of the response/target variable for local causal discovery or feature selection, said system comprising the performance of the following steps:
   1) find an approximation of the set of direct causes and direct effects of response variable T using the following steps:
      a) initialize a set of candidates to be a subset of all variables minus the response variable T;
      b) initialize a priority queue of variables to be examined for inclusion in the candidates set from the remaining variables;
      c) apply a user-provided inclusion heuristic function to prioritize variables in the priority queue for inclusion in the candidates set;
      d) remove non-eligible variables from the priority queue;
      e) insert in the candidates set the highest-priority variable(s) in the priority queue and remove them from the priority queue;

f) apply a user-provided elimination strategy to remove variables from the candidates set;

g) iterate among the inclusion, prioritization and elimination steps c, d, e and f according to a user-provided interleaving strategy until a termination criterion is met; variables may be re-ranked after each update of the candidate set, or the original ranking may be used throughout the method's operation;

2) store the candidate set resulting from step (1) in $PC_T$; and 3) output the set $PC_T$.

19. A computer system comprising hardware and associated software for finding a set of direct causes and direct effects of the response/target variable or for finding a Markov blanket of the response/target variable for local causal discovery or feature selection, said system comprising the performance of the following steps:

1) find an approximation of the set of direct causes and direct effects of response variable T using the following steps:

a) initialize a set of candidates to be a subset of all variables minus the response variable T;

b) initialize a priority queue of variables to be examined for inclusion in the candidates set from the remaining variables;

c) apply a user-provided inclusion heuristic function to prioritize variables in the priority queue for inclusion in the candidates set;

d) remove non-eligible variables from the priority queue;

e) insert in the candidates set the highest-priority variable(s) in the priority queue and remove them from the priority queue;

f) apply a user-provided elimination strategy to remove variables from the candidates set;

g) iterate among the inclusion, prioritization and elimination steps c, d, e and f according to a user-provided interleaving strategy until a termination criterion is met; variables may be re-ranked after each update of the candidate set, or the original ranking may be used throughout the method's operation;

2) store the candidate set resulting from step (1) in $PC_T$;

3) for every variable $X_i$ belonging in $PC_T$, apply step (1) designating $X_i$ as the response variable;

4) for every variable $X_i$ belonging in $PC_T$, if the response variable T is not in the output of step (3) for the response variable $X_i$, then eliminate $X_i$ from $PC_T$;

5) for every variable Y that belongs to $PC_T$, run steps (1)-(4) to obtain the sets $PC_T$;

6) initialize the set of candidate Markov blanket variables $MB_T$ of the response variable T with $PC_T$;

7) initialize the set of potential spouses that are not direct causes and effects of T (S) with the union of variables in $PC_Y$ (over all Y belonging to $PC_T$) excluding the response variable T and the set $PC_T$;

8) eliminate non-spouses of T from S by applying the following steps for every variable X in S:

a) retrieve or obtain a subset Z that makes X probabilistically independent of the response variable T variable given Z;

b) for every variable Y that belongs to $PC_T$ such that X belongs to $PC_Y$, implying that Y is a potential common child of T and X: If the response variable T is not probabilistically independent from X given the union of Z and Y then conclude that X is a spouse of the response variable T and insert X into the set of candidate Markov blanket members of the response variable T ($MB_T$);

9) optionally: eliminate from $MB_T$ variables that are predictively redundant for the response variable T using one of many established backward wrapper approaches; and 10) output the set $MB_T$.

20. A computer implemented method for transformation of a dataset with many variables into a reduced dataset with variables in the set of direct causes and direct effects of the response/target variable or Markov blanket of the response/target variable, said method comprising the following steps:

1) find an approximation of the set of direct causes and direct effects of response variable T using the following steps:

a) initialize a set of candidates to be a subset of all variables minus the response variable T;

b) initialize a priority queue of variables to be examined for inclusion in the candidates set from the remaining variables;

c) apply a user-provided inclusion heuristic function to prioritize variables in the priority queue for inclusion in the candidates set;

d) remove non-eligible variables from the priority queue;

e) insert in the candidates set the highest-priority variable(s) in the priority queue and remove them from the priority queue;

f) apply a user-provided elimination strategy to remove variables from the candidates set;

g) iterate among the inclusion, prioritization and elimination steps c, d, e and f according to a user-provided interleaving strategy until a termination criterion is met; variables may be re-ranked after each update of the candidate set, or the original ranking may be used throughout the method's operation;

2) store the candidate set resulting from step (1) in $PC_T$; and 3) output the set $PC_T$.

21. A computer implemented method for transformation of a dataset with many variables into a reduced dataset with variables in the Markov blanket of the response/target variable, said method comprising the following steps:

1) find an approximation of the set of direct causes and direct effects of response variable T using the following steps:

a) initialize a set of candidates to be a subset of all variables minus the response variable T;

b) initialize a priority queue of variables to be examined for inclusion in the candidates set from the remaining variables;

c) apply a user-provided inclusion heuristic function to prioritize variables in the priority queue for inclusion in the candidates set;

d) remove non-eligible variables from the priority queue;

e) insert in the candidates set the highest-priority variable(s) in the priority queue and remove them from the priority queue;

f) apply a user-provided elimination strategy to remove variables from the candidates set;

g) iterate among the inclusion, prioritization and elimination steps c, d, e and f according to a user-provided interleaving strategy until a termination criterion is met; variables may be re-ranked after each update of the candidate set, or the original ranking may be used throughout the method's operation;

2) store the candidate set resulting from step (1) in $PC_T$;

3) for every variable $X_i$ belonging in $PC_T$, apply step (1) designating $X_i$ as the response variable;

4) for every variable $X_i$ belonging in $PC_T$, if the response variable T is not in the output of step (3) for the response variable $X_i$, then eliminate $X_i$ from $PC_T$; and
5) for every variable Y that belongs to $PC_T$, run steps (1)-(4) to obtain the sets $PC_Y$;
6) initialize the set of candidate Markov blanket variables $MB_T$ of the response variable T with $PC_T$;
7) initialize the set of potential spouses that are not direct causes and effects of T (S) with the union of variables in $PC_Y$ (over all Y belonging to $PC_T$) excluding the response variable T and the set $PC_T$;
8) eliminate non-spouses of T from S by applying the following steps for every variable X in S:
   a) retrieve or obtain a subset Z that makes X probabilistically independent of the response variable T variable given Z;
   b) for every variable Y that belongs to $PC_T$ such that X belongs to $PC_Y$, implying that Y is a potential common child of T and X: If the response variable T is not probabilistically independent from X given the union of Z and Y then conclude that X is a spouse of the response variable T and insert X into the set of candidate Markov blanket members of the response variable T ($MB_T$);
9) optionally: eliminate from $MB_T$ variables that are predictively redundant for the response variable T using one of many established backward wrapper approaches; and
10) output the set $MB_T$.

* * * * *